(12) United States Patent
Hamada et al.

(10) Patent No.: US 8,204,357 B2
(45) Date of Patent: Jun. 19, 2012

(54) REPRODUCING DEVICE, REPRODUCING METHOD, REPRODUCING PROGRAM AND RECORDING MEDIUM

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 10/574,582

(22) PCT Filed: Sep. 16, 2004

(86) PCT No.: PCT/JP2004/013988
§ 371 (c)(1),
(2), (4) Date: Apr. 4, 2006

(87) PCT Pub. No.: WO2005/039177
PCT Pub. Date: Apr. 28, 2005

(65) Prior Publication Data
US 2007/0003221 A1   Jan. 4, 2007

(30) Foreign Application Priority Data
Oct. 15, 2003   (JP) .................................. 2003-354741

(51) Int. Cl.
*H04N 9/80*   (2006.01)

(52) U.S. Cl. ........................................ 386/239; 386/353

(58) Field of Classification Search ............ 386/95, 386/353, 354, 357, 239; 348/563–570, 584–586
See application file for complete search history.

(56) References Cited

U.S. PATENT DOCUMENTS

| | | | | |
|---|---|---|---|---|
| 4,218,710 A | * | 8/1980 | Kashigi et al. | 348/513 |
| 4,360,831 A | * | 11/1982 | Kellar | 348/585 |
| 4,961,153 A | * | 10/1990 | Fredrickson et al. | 345/422 |
| 5,315,390 A | * | 5/1994 | Windrem | 348/584 |
| 5,530,797 A | * | 6/1996 | Uya et al. | 345/532 |

(Continued)

FOREIGN PATENT DOCUMENTS

DE   4114440   * 5/1992

(Continued)

OTHER PUBLICATIONS

Tanebaum, Andrew S, "Structured Computer Organization", Prentice-Hall Inc, 1984, pp. 10-12.*

(Continued)

*Primary Examiner* — David Harvey
(74) *Attorney, Agent, or Firm* — Oblon, Spivak, McClelland, Maier & Neustadt, L.L.P.

(57) ABSTRACT

For a BD-ROM, a picture-in-picture function and a wallpaper display function are accomplished. A second video plane 50 for displaying a moving picture is added to planes 10, 11, and 12 for displaying a moving picture, a subtitle, and graphics, respectively. One of the outputs of the second video plane 50 and the video plane 10 is selected by a switch 51 on a pixel-by-pixel basis. Reduced moving picture data are stored on the second video plane 50. The switch 51 is controlled according to a display position of the reduced moving picture data on a pixel-by-pixel basis. As a result, reduced moving picture data of the second video plane 50 are displayed as a sub screen against the moving picture data of the video plane 10. When wallpaper picture data instead of the moving picture data are stored on the video plane 10, a display screen is obtained as if a wallpaper were displayed in the background of the reduced moving picture data.

12 Claims, 15 Drawing Sheets

U.S. PATENT DOCUMENTS

| | | | |
|---|---|---|---|
| 5,912,710 A * | 6/1999 | Fujimoto | 348/445 |
| 6,147,717 A | 11/2000 | Jun | |
| 6,493,036 B1 | 12/2002 | Fernandez | |
| 6,558,049 B1 | 5/2003 | Shin | |
| 6,661,426 B1 * | 12/2003 | Jetha et al. | 345/629 |
| 6,741,794 B1 * | 5/2004 | Sumioka et al. | 386/95 |
| 6,888,577 B2 * | 5/2005 | Waki et al. | 348/589 |
| 7,054,539 B2 * | 5/2006 | Ito et al. | 386/46 |
| 7,236,645 B2 * | 6/2007 | Hayashi et al. | 382/284 |
| 7,463,311 B2 * | 12/2008 | Flesch et al. | 348/589 |
| 7,496,278 B2 * | 2/2009 | Miyamoto et al. | 386/95 |
| 7,623,140 B1 * | 11/2009 | Yeh et al. | 345/629 |
| 7,676,142 B1 * | 3/2010 | Hung | 386/131 |
| 2001/0040584 A1 | 11/2001 | Deleeuw | |
| 2002/0034252 A1 * | 3/2002 | Owen et al. | 375/240.17 |
| 2003/0156824 A1 * | 8/2003 | Lu | 386/68 |
| 2003/0190152 A1 * | 10/2003 | Okada et al. | 386/95 |

FOREIGN PATENT DOCUMENTS

| | | | |
|---|---|---|---|
| EP | 0447197 | * | 3/1991 |
| EP | 1 170 942 A1 | | 1/2002 |
| JP | 59-114581 | | 7/1984 |
| JP | 61-59481 | | 3/1986 |
| JP | 03-251893 | | 11/1991 |
| JP | 04-248591 | | 9/1992 |
| JP | 6-14300 | | 1/1994 |
| JP | 7-38858 | | 2/1995 |
| JP | 07-162817 | | 6/1995 |
| JP | 9-284692 | | 10/1997 |
| JP | 10-145735 | | 5/1998 |
| JP | 10-304309 | | 11/1998 |
| JP | 11-355714 | | 12/1999 |
| JP | 2000-194354 | * | 7/2000 |
| JP | 2001-189703 | | 7/2001 |
| JP | 2001-238094 | | 8/2001 |
| JP | 2003-101957 | | 4/2003 |
| JP | 2003-234974 | | 8/2003 |
| JP | 2003-259213 | | 9/2003 |
| JP | 2003-289505 | | 10/2003 |
| WO | WO 03/063467 | | 7/2003 |
| WO | WO 2005/036875 | * | 5/2005 |

OTHER PUBLICATIONS

Brett et al, "Video Processing Fore Single-Chip DVB Decoder" IEEE, 2001.*

Summons to Attend Oral Proceedings mailed Dec. 19, 2011, in European Patent Application No. 04773378.7.

* cited by examiner

*Fig. 3*

| TYPE | DESCRIPTION |
|---|---|
| VIDEO PLANE | 1920x1080x16 BITS, YCbCr(4:2:2), 8 BITS EACH |
| PRESENTATION GRAPHICS PLANE | 1920x1080x8 BITS, 8-BIT COLOR MAP ADDRESSES (PALETTE) + 256-LEVEL ALPHA-BLENDING |
| INTERACTIVE GRAPHICS PLANE | 1920x1080x8 BITS, 8-BIT COLOR MAP ADDRESSES (PALETTE) + 256-LEVEL ALPHA-BLENDING |

Fig. 5

| INPUT | INPUT ADDRESS, 8 BITS |
|---|---|
| OUTPUT | OUTPUT DATA, 8 BITS x4, OUTPUTS OF (R, G, B, $\alpha$) |

Fig. 6

| | VALUES OF THREE PRIMARY COLORS | | | OPACITY |
|---|---|---|---|---|
| COLOR INDEX VALUE | R | G | B | $\alpha$ |
| 0x00 | 0 | 0 | 0 | 1 |
| 0x01 | 10 | 100 | 30 | 0.5 |
| ⋮ | ⋮ | ⋮ | ⋮ | |
| ⋮ | ⋮ | ⋮ | ⋮ | |
| 0xFF | 200 | 255 | 100 | 0.8 |

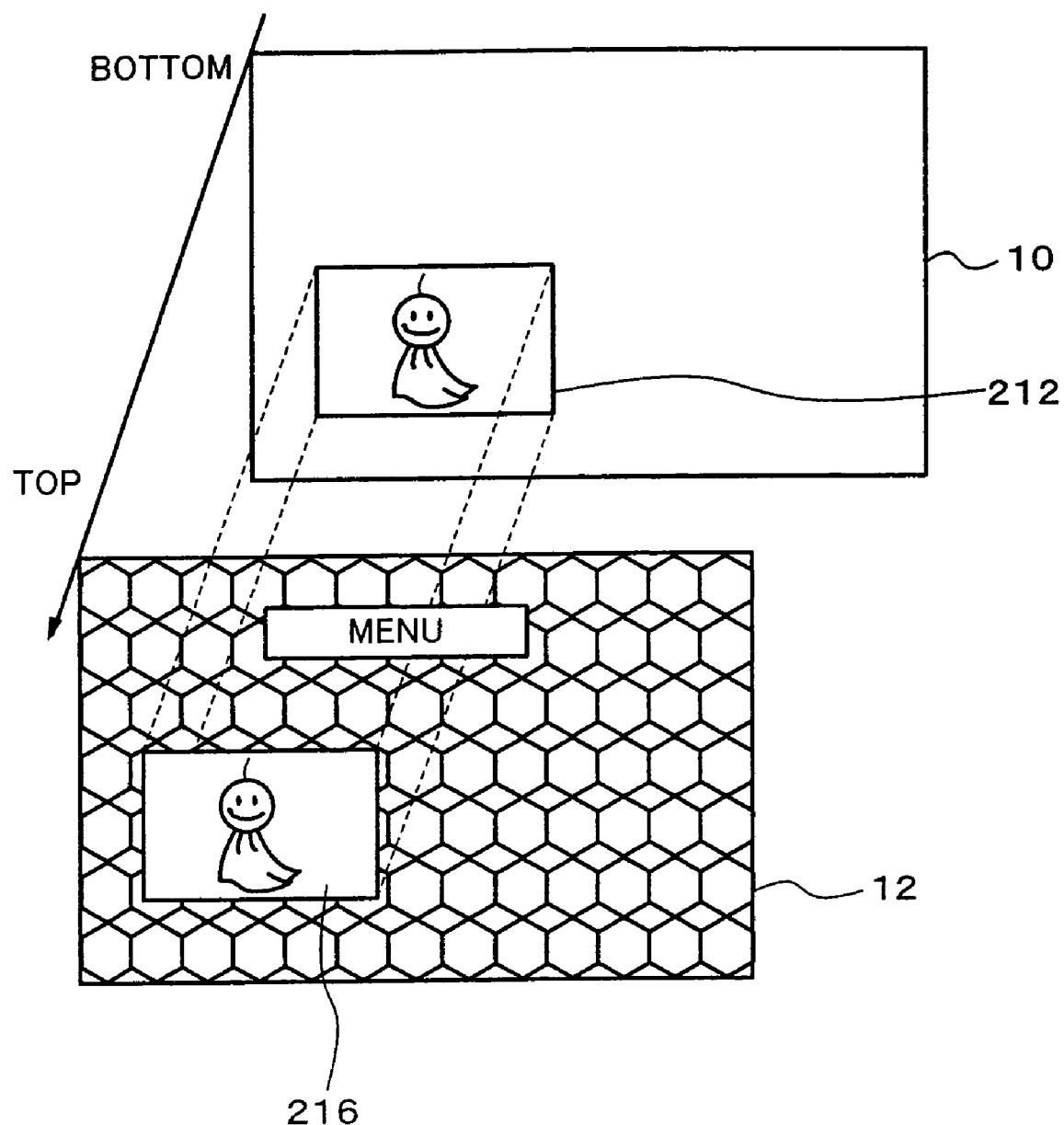

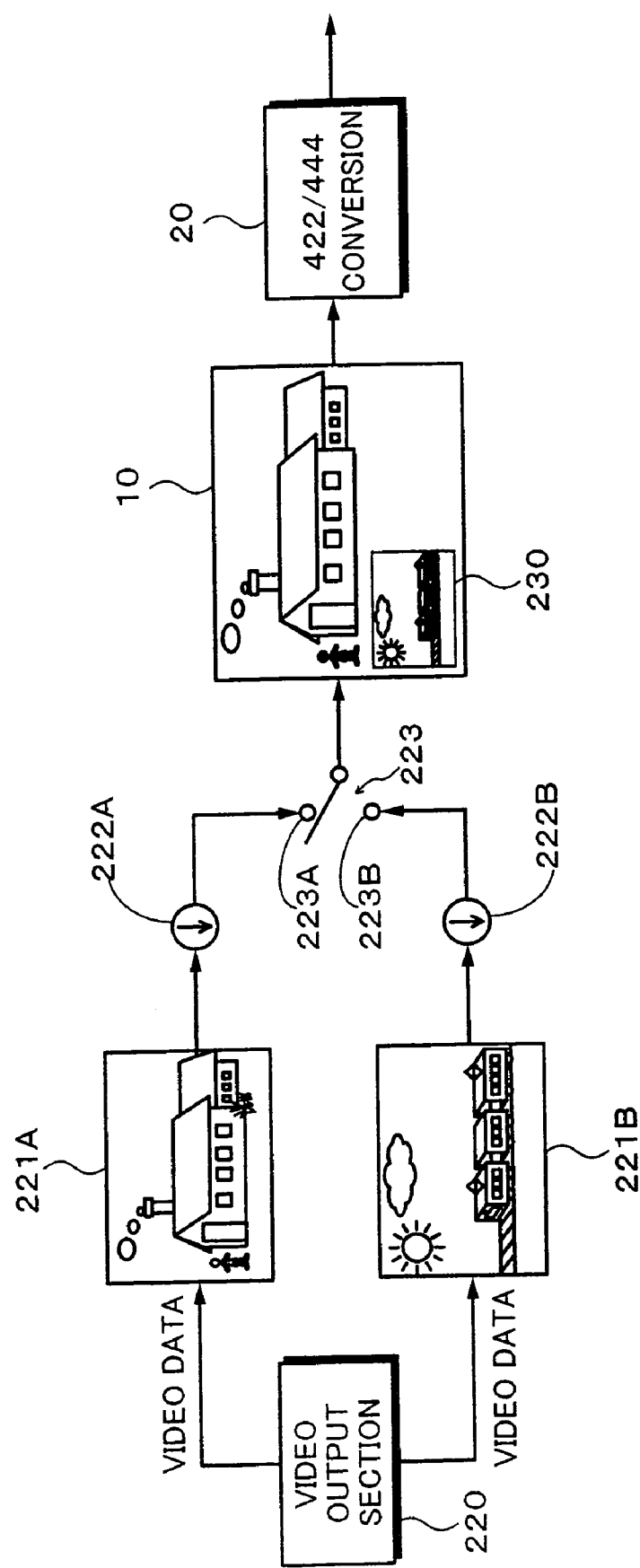

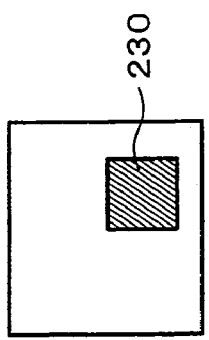
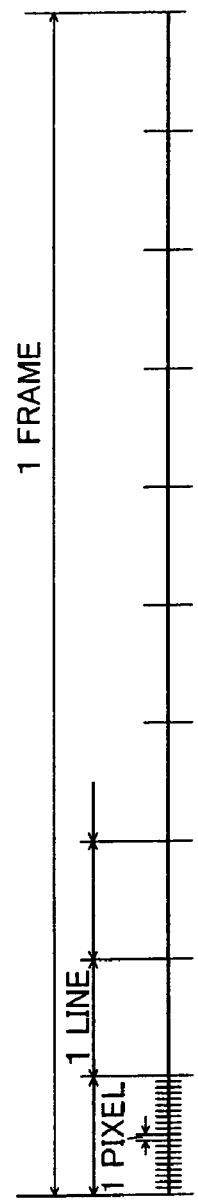
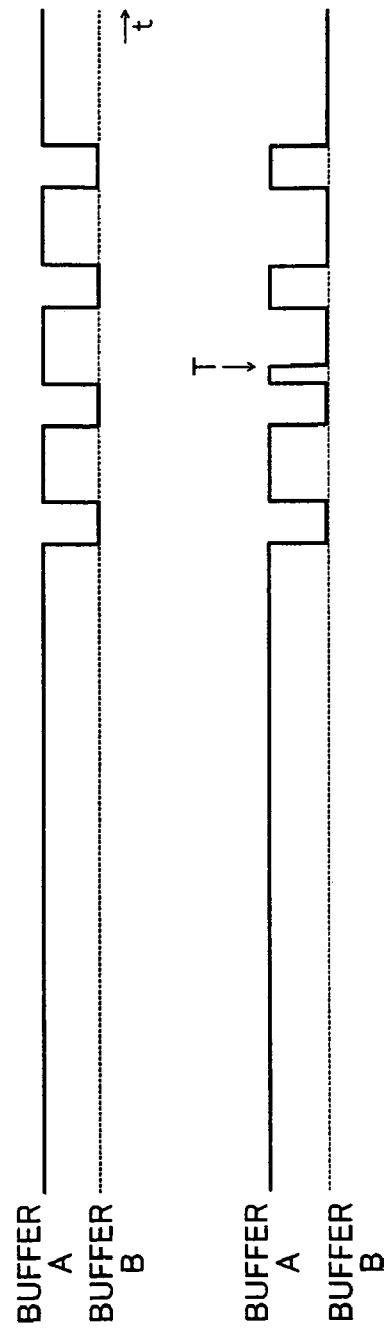
*Fig. 13A*
*Fig. 13B*
*Fig. 13C*
*Fig. 13D*

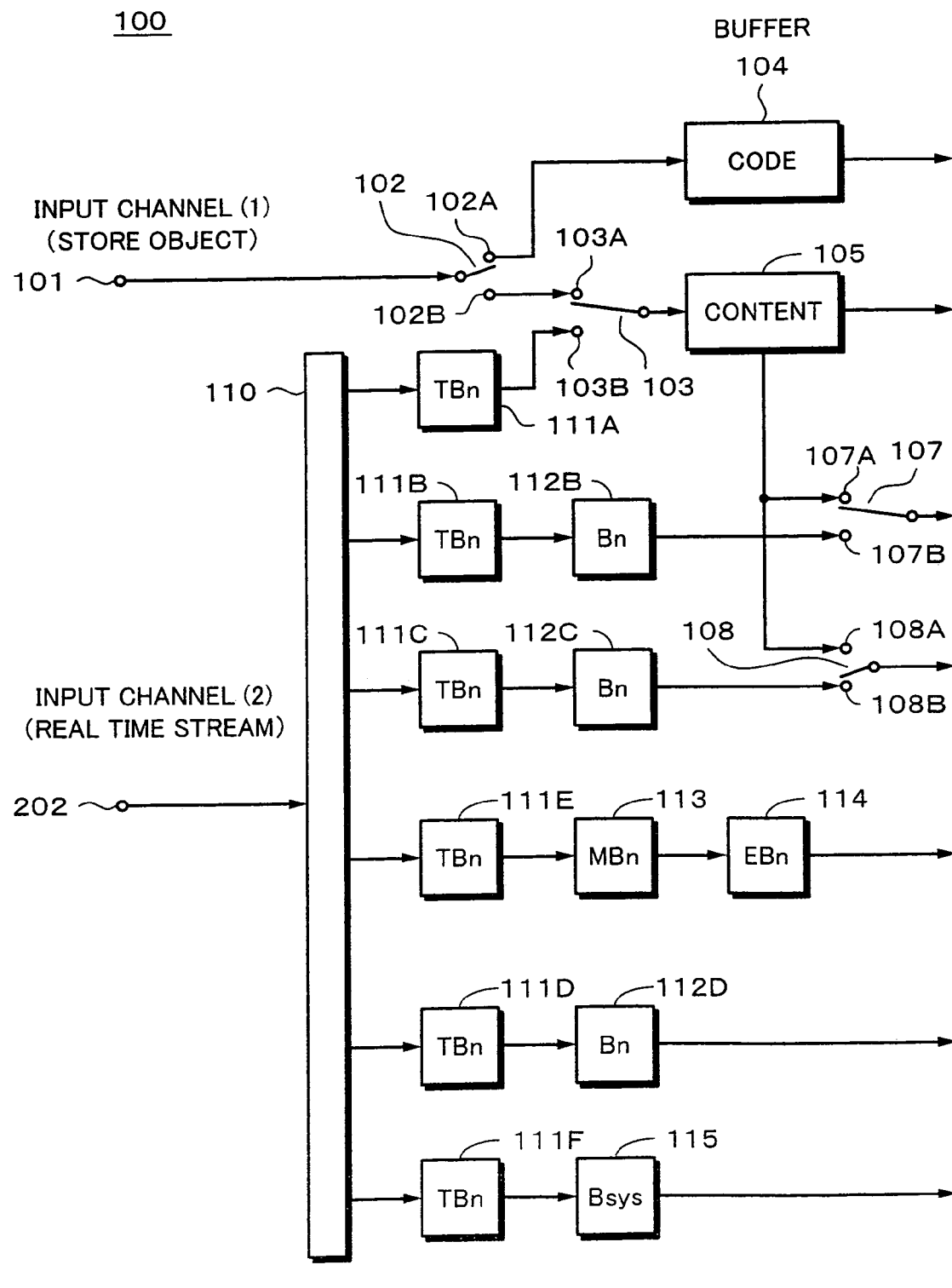

REPRODUCING DEVICE, REPRODUCING METHOD, REPRODUCING PROGRAM AND RECORDING MEDIUM

TECHNICAL FIELD

The present invention relates to a reproduction apparatus, a reproduction method, a reproduction program, and a record medium that allow a program recorded on a large capacity record medium such as a Blu-ray disc to accomplish a picture-in-picture function.

BACKGROUND ART

In recent years, as a standard for a disc type record medium detachable from a record and reproduction apparatus, Blu-ray Disc standard has been proposed. The Blu-ray Disc standard uses a disc as a record medium that has a diameter of 12 cm and that is coated with a cover layer having a thickness of 0.1 mm, a blue-purple laser having a wavelength of 405 nm, and an objective lens having a numerical aperture of 0.85 as optical systems. The Blu-ray Disc accomplishes a maximum of 27 GB record capacity that allows more than 2 hours of a Japanese BS digital high-vision broadcast program to be recorded without deterioration of picture quality.

It is expected that there will be AV (Audio/Video) signal sources that are analog signals and digital signals of for example analog television broadcast programs and digital television broadcast programs, respectively. In the Blu-ray Disc standard, sub-standards for methods of recording these broadcast programs have been established.

On the other hand, as a derivative standard of the current Blu-ray Disc standard, reproduction-only record mediums on which a movie, music, or the like is pre-recoded are being developed. Although DVDs (Digital Versatile Discs) have been widespread as disc-shaped record mediums on which a movie or music is pre-recorded, since reproduction-only optical discs based on the Blu-ray Disc standard feature a large capacity, high speed transfer rate, and so forth of the Blu-ray Disc standard and these discs have a record duration of two hours or longer of high-vision pictures with high picture quality, they are largely different from and superior to the existing DVDs. Hereinafter, the reproduction-only record mediums based on the Blu-ray Disc derivative standard is referred to as the BD-ROM (Blu-ray Disc-Read Only Memory) to distinguish them from the recordable Blu-ray Discs.

On the other hand, in the current Blu-ray Disc standard, user interface functions such as a method of displaying a list of video contents recorded on a disc, a function that displays a cursor on the list, and a function that allows the user to select a video content that he or she wants to reproduce have not been established. These functions are accomplished by a record and reproduction apparatus that records and reproduces data onto and from a Blu-ray Disc. Thus, the layout of the content list screen varies depending on the record and reproduction apparatus that reproduces the data. Thus, since there are also difference in user interfaces, they are not always user-friendly. For the reproduction-only discs, every reproduction apparatus need to accomplish user interfaces such as a menu screen as the disc (content) creator designed.

A multi-story function that displays a selection screen during reproduction of a video content and branches the main story to a sub-story depending on user's selection is generally referred to as the interactive function. To accomplish the interactive function, the disc creator needs to create a scenario that contains a reproduction sequence and branches that he or she designated, code the created scenario with a programming language, a script language, or the like, and record the program onto a disc. When the reproduction apparatus reads and executes the program, the apparatus can reproduce a video content and display a branch selection screen as the disc creator intended.

To accomplish the user interfaces as the disc creator intended, a method of generating a menu screen and a branch selection screen and a method of coding a process corresponding to user's input are required. However in the Blu-ray Disc standard (Blu-ray Disc Rewritable Format Ver 1.0), these methods have not been established. Thus, to date, it is difficult to cause every reproduction apparatus to reproduce a video content recorded on a Blue-ray Disc according to a scenario that the disc creator created regardless of the maker and model of the reproduction apparatus.

In addition, reproduction-only discs on which movies are pre-recorded need to have a subtitle display scheme. However, in the current Blu-ray Disc standard, the subtitle display scheme has not been established.

On the other hand, however, for example in the DVD (Digital Versatile Disc) standard, the foregoing interactive functions have been accomplished. For example, while a moving picture is being reproduced from a DVD-video, a menu screen is called with for example a remote control commander. By selecting a button displayed on the menu screen, the current scene can be changed to another scene. Moreover, in the DVD standard, a subtitle display scheme has been established. As the subtitle display scheme, one of a Japanese subtitle and an English subtitle that have been prepared can be selectively displayed.

In the case of the DVDs, the menu screen is composed of fixed sub picture data. When the menu screen is called, the sub picture data is composed with moving picture data and the combined data are displayed. Japanese Patent Application Laid-Open Publication No. HEI 10-308924 describes a structure that combines sub picture data with moving picture data and records the combined data onto a recordable DVD.

For the foregoing BD-ROMs, a technology that accomplishes a subtitle display and an interactive display has been proposed. In this technology, planes for a moving picture, a sub-picture (subtitle), and a menu are provided. The pictures of the three planes are combined into one picture. The combined picture is output.

According to this related art, a moving picture plane for a moving picture, a subtitle plane for a subtitle, and a graphics plane for a menu screen, buttons, and so forth are layered in the order so that the moving picture plane is the bottom plane and the graphics plane is the top plane. The subtitle plane is combined with the moving picture plane. The graphics plane is combined with the combined picture. When the subtitle plane and the graphics plane are combined, the opacity can be set on a pixel-by-pixel basis. When the opacity of a pixel of one plane is set at 0, a corresponding pixel of the next lower plane is displayed through the pixel of the upper plane.

The reproduction-only DB-ROMs need to have the so-called picture-in-picture function of which a small video picture is displayed in a large video picture.

In the picture-in-picture function, in a multi-angle picture composed of a plurality of pictures reproduced in the same time sequence, while a main angle picture is being displayed on a main screen, a second angle picture can be displayed on a sub screen that is a small area of the main screen.

When the picture-in-picture function is accomplished, it is necessary to provide a method of treating two video signals in parallel, combining pictures of these video signals, and displaying the combined picture on one screen.

In addition, when the picture-in-picture function is accomplished, a picture having a size of the main screen is reduced so that the reduced picture can be displayed in the sub screen. In many cases, the reduced picture and the main picture are combined and the combined picture is displayed. Thus, it is necessary to provide a method of supplying a reduced picture to a moving picture plane and combining the reduced picture and a moving picture.

In addition, it is necessary to provide a method of displaying a so-called wallpaper that is a picture of which a predetermined pattern is repeated in the background of reduced moving picture data.

DISCLOSURE OF THE INVENTION

Therefore, an object of the present invention is to provide a reproduction apparatus, a reproduction method, a reproduction program, and a record medium that allow the picture-in-picture function to be accomplished with the BD-ROM.

Another object of the present invention is to provide a reproduction apparatus, a reproduction method, a reproduction program, and a record medium that allow a wallpaper to be displayed in the background to moving picture data with the BD-ROM.

To solve the foregoing problem, the present invention is a reproduction apparatus, comprising first storage means for storing first moving picture data reproduced from a record medium; second storage means for storing second moving picture data reproduced form the record medium; and selection means for selecting one of outputs of the first storage means and the second storage means on a predetermined area-by-area basis, wherein a display signal is generated corresponding to an output of the selection means.

In addition, the present invention is a reproduction method, comprising the steps of storing first moving picture data reproduced from a record medium to first storage means; storing second moving picture data reproduced form the record medium to second storage means; and selecting one of outputs of the first storage means and the second storage means on a predetermined area-by-area basis, wherein a display signal is generated corresponding to an output of the selection step.

In addition, the present invention is a reproduction program that causes a computer device to execute a reproduction method, comprising the steps of storing first moving picture data reproduced from a record medium to first storage means; storing second moving picture data reproduced form the record medium to second storage means; and selecting one of outputs of the first storage means and the second storage means on a predetermined area-by-area basis, wherein a display signal is generated corresponding to an output of the selection step.

In addition, the present invention is a computer readable record medium on which a reproduction program has been recorded, the reproduction program causing a computer device to execute a reproduction method, comprising the steps of storing first moving picture data reproduced from a record medium to first storage means; storing second moving picture data reproduced form the record medium to second storage means; and selecting one of outputs of the first storage means and the second storage means on a predetermined area-by-area basis, wherein a display signal is generated corresponding to an output of the selection step.

As described above, according to the present invention, one of the outputs of the first storage means that stores the first moving picture data reproduced from the record medium and the second storage means that stores the second moving picture data reproduced from the record medium is selected on a predetermined area-by-area basis and a display signal is generated. Thus, the first moving picture data and the second moving picture data can be exclusively combined and displayed.

BRIEF DESCRIPTION OF DRAWINGS

FIG. 3 is a table describing the resolution and displayable colors of each plane;

FIG. 5 is a table showing an example of input/output data of a palette;

FIG. 6 is a table showing an example of a palette table stored in the palette;

FIG. 11 is a schematic diagram describing a method of accomplishing a wallpaper picture display according to the second embodiment of the present invention;

FIG. 12 is a functional block diagram showing an example of a structure that accomplishes the picture-in-picture with one video plane;

FIG. 13A, FIG. 13B, FIG. 13C, and FIG. 13D are schematic diagrams describing selection timing of a switch; and FIG. 14A, FIG. 14B, and FIG. 14C are parts of a functional block diagram showing an example of the structure of a player-decoder according to the first embodiment of the present invention.

BEST MODES FOR CARRYING OUT THE INVENTION

Next, an embodiment of the present invention will be described. For easy understanding, before describing an embodiment of the present invention, an outlined structure that displays video data and a method of combining a moving picture plane, a subtitle plane, and a graphics plane proposed as the BD-ROM HD (High Definition) movie mode standard will be explained. The BD-ROM HD movie mode has been proposed so as to provide a BD-ROM interactive function equivalent to a DVD-video interactive function.

Figure 1:
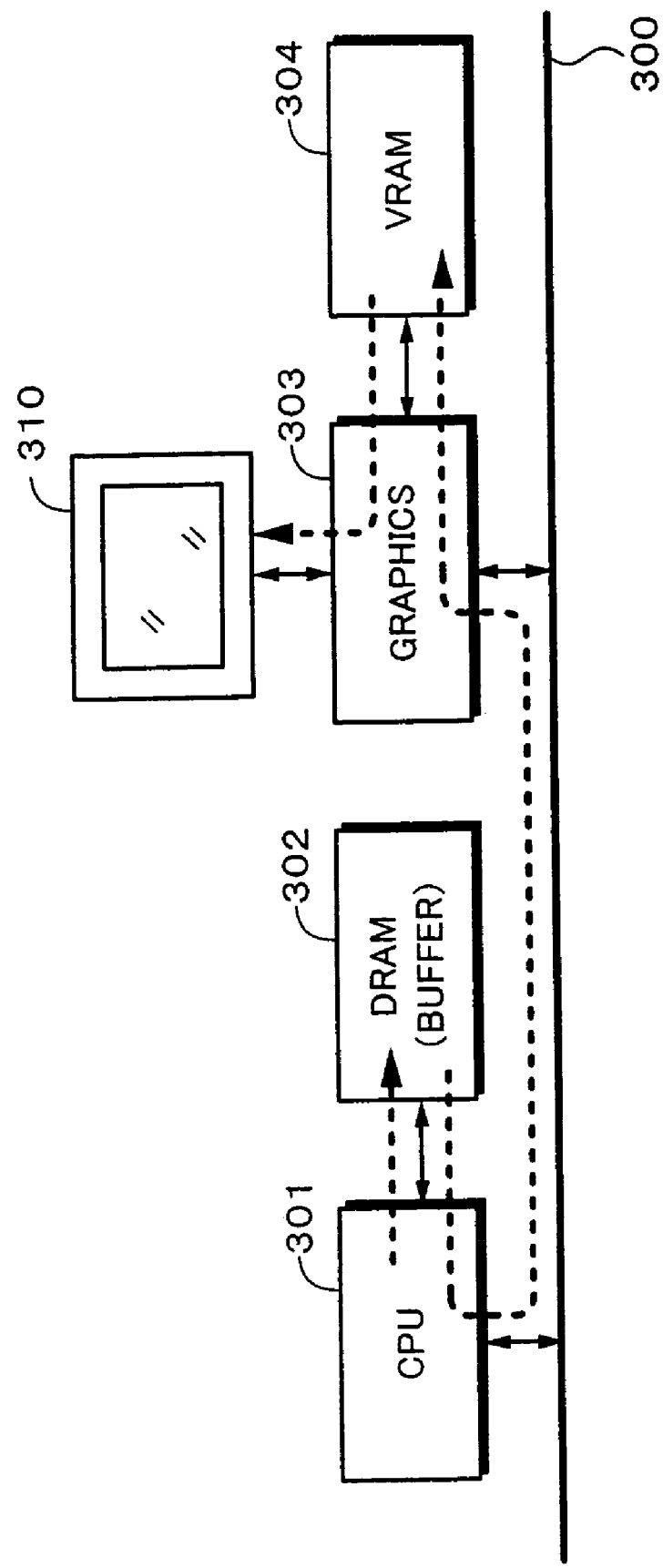
FIG. 1 is a block diagram showing a typical example of the structure that displays picture data.

FIG. 1 is a schematic diagram showing a typical example of a structure that displays video data. In FIG. 1, only necessary sections are shown. A CPU (Central Processing Unit) 301 and a graphics section 303 are connected to a bus 300. A DRAM (Dynamic Random Access Memory) 302 as a work memory is connected to the CPU 301. A VRAM (Video RAM) 304 is connected to the graphics section 303. An output of the graphics section 303 is supplied to a display 310.

The CPU 301 uses the DRAM 302 as a frame buffer and performs a predetermined process such as a reduction process for video data. The CPU 301 reads the processed video data from the DRAM 302 and supplies the video data to the graphics section 303 through the bus 300.

The graphics section 303 sets horizontal and vertical scanning frequencies for the display 310 to decide a display resolution and has a graphics control chip that executes a rendering instruction issued from the CPU 301. Video data supplied to the graphics section 303 are written to the VRAM 304. The graphics section 303 reads video data from the VRAM 304 corresponding to predetermined horizontal and vertical scanning frequencies and supplies the video data as a digital video signal to the display 310. In other words, the VRAM 304 corresponds to a plane. Data stored in the VRAM 304 directly affect data displayed on the display 310.

Next, the structure of planes in the BD-ROM HD movie mode and a method of combining these planes will be described. In the following description, the moving picture plane, the subtitle plane, and the graphics plane described in the related art section are referred to as a video plane, a presentation graphics plane, and an intetactive graphics plane, respectively.

Figure 2:
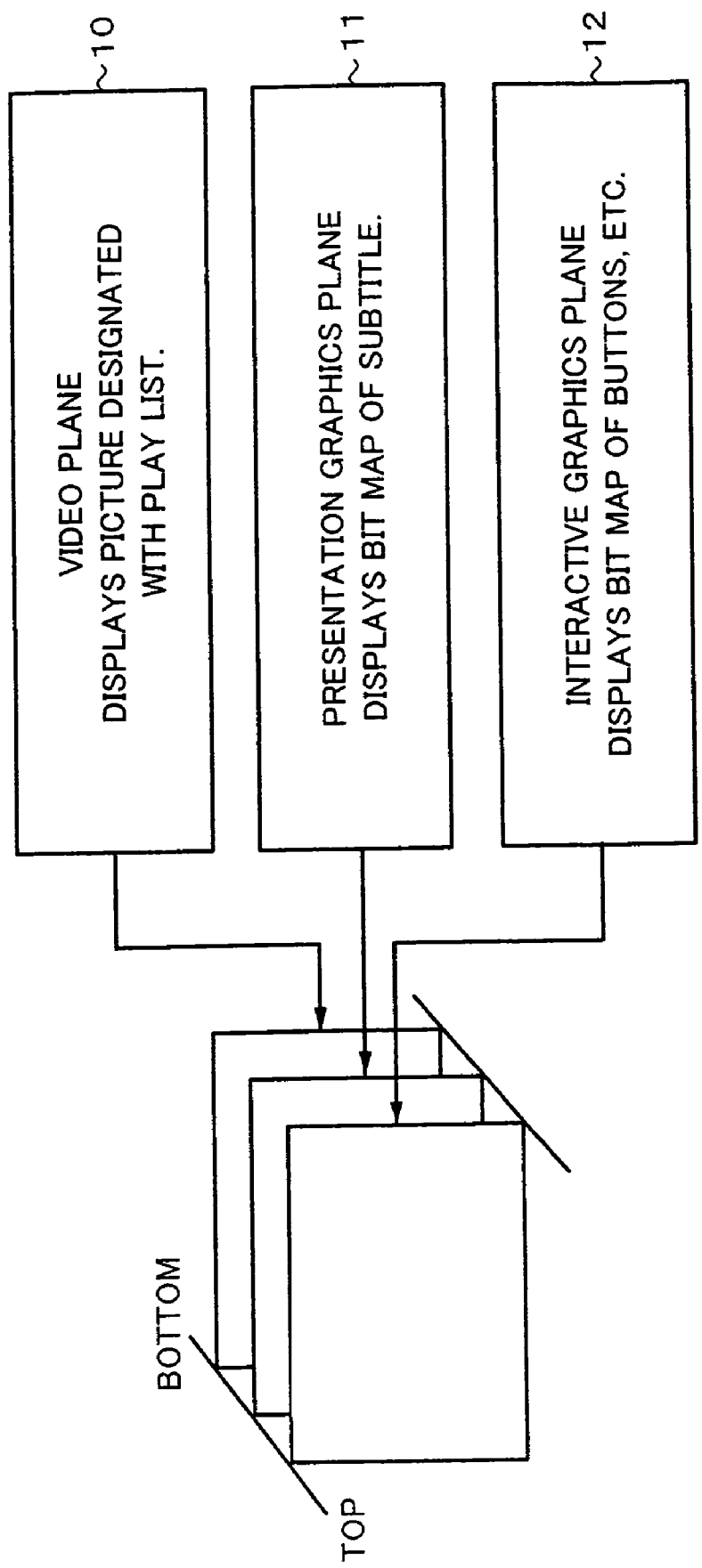
FIG. 2 is a schematic diagram showing an example of the structure of a video plane, a presentation graphics plane, and an interactive graphics plane.

FIG. 2 shows an example of the structure of a video plane 10, a presentation graphics plane 11, and an interactive graphics plane 12. The video plane 10 is the bottommost plane and used to display a picture (mainly, moving picture data) designated in a play list. The presentation graphics plane 11 is the next bottommost plane placed above the video plane 10 and is used to display subtitle data while a moving picture is being reproduced. The interactive graphics plane 12 is the topmost plane and is used to display graphics data for parts used in a GUI (Graphical User Interface) such as character data and bit map data such as buttons that compose a menu screen. One display screen is displayed by combining these three planes.

The video plane 10, the presentation graphics plane 11, and the interactive graphics plane 12 can be independently displayed. The video plane 10, the presentation graphics plane 11, and the interactive graphics plane 12 each have a resolution and displayable colors as shown in FIG. 3. The video plane 10 has a resolution of 1920 pixels×1080 lines and a data length of 16 bits per pixel. The video plane 10 also uses a YCbCr (4:2:2) system of which the ratio of brightness signal Y and color difference signals Cb and Cr is 4:2:2. In the YCbCr (4:2:2) system, each of the brightness signal Y and the color difference signals Cb and Cr has eight bits. Two horizontal bits of the color difference signals Cb and Cr compose one color.

The presentation graphics plane 11 has a resolution of 1920 pixels×1080 lines and a sampling depth of eight bits per pixel. The presentation graphics plane 11 uses a color system that has eight-bit color map addresses with a 256-color palette.

The interactive graphics plane 12 has a resolution of 1920 pixels×1080 lines and a sampling depth of eight bits per pixel. The interactive graphics plane 12 uses a color system that have eight-bit color map addresses with a 256-color palette.

Instead, the video plane 10 may have resolutions of 1280 pixels×720 lines, 720 pixels×480 lines, and 720 pixels×576 lines. In these cases, the presentation graphics plane 11 and the interactive graphics plane 12 have the same resolution as the video plane 10 has.

In the foregoing example, the presentation graphics plane 11 and the interactive graphics plane 12 use a color system having eight-bit color map addresses with a 256-color palette. However, the present invention is not limited to such an example. The number of colors may be increased by changing the sampling depth and increasing the number of colors of the palette. When the sampling depth is 12 bits, the number of colors used with the palette becomes 4096. Likewise, YCbCr (4:4:4) and RGB (4:4:4) that have a sampling depth of 24 bits and no palette and of which each pixel has color information can be accomplished.

On the interactive graphics plane 12 and the presentation graphics plane 11, alpha-blending can be performed in 256 levels so that these planes can be combined with another plane in 256 levels of opacity. The opacity of these planes can be set on a pixel-by-pixel basis. In the following description, it is assumed that the opacity α is represented in the range of $0 \leq \alpha \leq 1$, that opacity α=0 represents perfect transparent, and opacity α=1 represents perfect opaque.

The presentation graphics plane 11 is used to display for example PNG (Portable Network Graphics) format video data. In addition, the interactive graphics plane 12 can be used to display PNG format video data. In the PNG format, the sampling depth of one pixel is in the range from one bit to 16 bits. When the sampling depth is eight bits or 16 bits, an alpha channel, namely opacity information (referred to as alpha data) of each pixel component can be added. When the sampling depth is eight bits, opacity can be designated in 256 levels. With opacity information of the alpha channel, alpha-blending is performed. In addition, a palette image of up to 256 colors can be used. An element (index) of a prepared palette can be designated by an index number.

Video data on the presentation graphics plane 11 and the interactive graphics plane 12 are not limited to the PNG format. Video data on the presentation graphics plane 11 and the interactive graphics plane 12 may be video data compressed according to another compression encoding system such as the JPEG system, video data compressed according to the run-length compression system, or bit map data that have not been compression-encoded.

Figure 4:
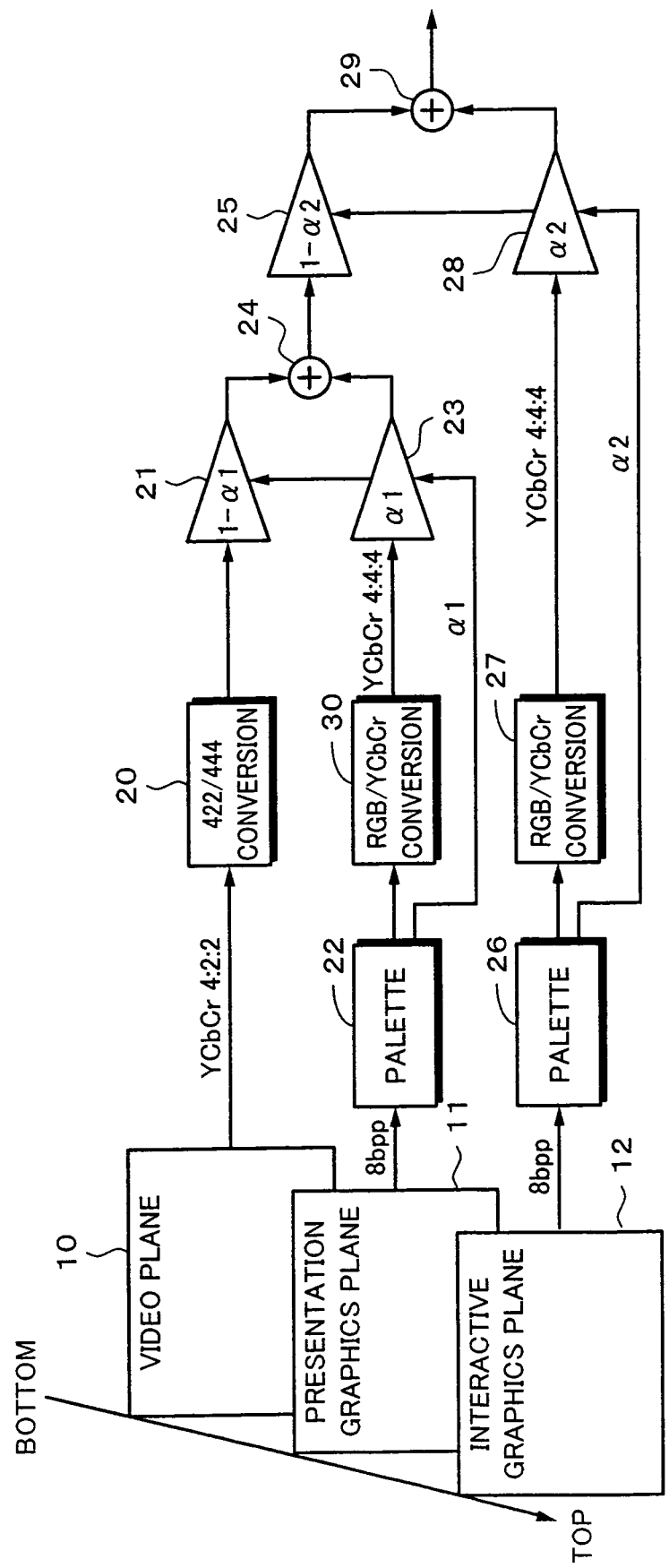
FIG. 4 is a functional block diagram showing an example of a structure that combines three planes.

FIG. 4 shows an example of a structure that combines the three planes according to the conditions shown in FIG. 2 and FIG. 3. Moving picture data of the video plane 10 are supplied to a 422/444 conversion circuit 20. The 422/444 conversion circuit 20 converts the color system of the moving picture data from YCbCr (4:2:2) into YCbCr (4:4:4). The converted moving picture data are input to a multiplication device 21. A resolution conversion circuit may be disposed between the 422/444 conversion circuit 20 and the multiplication device 21 to convert the resolution of the moving picture data into another resolution.

Video data of the presentation graphics plane 11 are input to a palette 22. The palette 22 outputs RGB (4:4:4) video data. When opacity has been designated for the video data by alpha-blending, the designated opacity α1 ($0 \leq \alpha \leq 1$) is output from the palette 22.

FIG. 5 shows an example of input/output data of the palette 22. The palette 22 stores palette information corresponding to for example an PNG format file as a table. The palette 22 references an index number with input eight-bit pixel data as an address. Corresponding to the index number, RGB (4:4:4) data composed of eight bits each are output. In addition, the palette 22 outputs data of the alpha-channel, which represents opacity.

FIG. 6 shows an example of the palette table stored in the palette 22. In the palette table, 256 color index values [0x00] to [0xFF] (where [0x] represents hexadecimal notation) are assigned three primary color values R, G, and B composed of eight bits each and opacity α. The palette 22 references the palette table according to the input PNG format video data and outputs color data of R, G, and B (RGB data) composed of eight bits each and opacity a according to index values designated with video data on a pixel-by-pixel basis. A palette 26 that will be described later stores the similar palette table.

The RGB data that have been output from the palette 22 are supplied to an RGB/YCbCr conversion circuit 30. The RGB/YCbCr conversion circuit 30 converts the RGB data into data of the luminance signal Y and the color difference signals Cb and Cr composed of eight bits each (hereinafter these data are together referred to as YCbCr data). This is because the planes need to be combined in the common data format. In this example, the YCbCr data format for moving picture data is commonly used.

The YCbCr data that have been output from the RGB/YCbCr conversion circuit 30 and the opacity data α1 are input to a multiplication device 23. A resolution conversion circuit may be disposed between the RGB/YCbCr conversion circuit 30 and the multiplication device 23 so as to convert the resolution of the YCbCr data into another resolution. The multiplication device 23 multiplies the input YCbCr data by the opacity data α1. The multiplied result is input to one input terminal of an addition device 24. The multiplication device 23 multiplies each of the luminance signal Y and the color difference signals Cb and Cr of the YCbCr data by the opacity data α1. In addition, the complement (1−α1) of the opacity data α1 is supplied to the multiplication device 21.

The multiplication device 21 multiplies the moving picture data that has been input from the 422/444 conversion circuit 20 by the complement (1−α1) of the opacity data α1. The multiplied result is input to the other input terminal of the addition device 24. The addition device 24 adds the multiplied results of the multiplication devices 21 and 23. As a result, the video plane 10 and the presentation graphics plane 11 are combined. The added result of the addition device 24 is input to a multiplication device 25.

Like the presentation graphics plane 11, the palette 26 outputs video data of the interactive graphics plane 12 as data of RGB (4:4:4). The video data are input to an RGB/YCbCr conversion circuit 27. When the color system of the video data that the interactive graphics plane 12 uses is RGB (4:4:4), the RGB/YCbCr conversion circuit 27 converts the color system of video data into YCbCr (4:4:4) and outputs YCbCr data. The YCbCr data that have been output from RGB/YCbCr conversion circuit 27 are input to a multiplication device 28. A resolution conversion circuit may be disposed between the RGB/YCbCr conversion circuit 27 and the multiplication device 28 so as to convert the resolution of the YCbCr data into another resolution.

When opacity of alpha-blending has been designated in the palette 26 according to index values, designated opacity α2 ($0 \leq \alpha2 \leq 1$) is output from the palette 26. The opacity data α2 are supplied to the multiplication device 28. The multiplication device 28 multiplies each of the luminance signal Y and the color difference signals Cb and Cr of the YCbCr data that have been output from the RGB/YCbCr conversion circuit 27 by the opacity data α2. The multiplied results of the multiplication device 28 are input to one input terminal of an addition device 29. The complement (1−α) of the opacity data α2 is supplied to the multiplication device 25.

The multiplication device 25 multiplies the added result of the addition device 24 by the complement (1−α) of the opacity data α2. The multiplied result of the multiplication device 25 is input to the outer input terminal of the addition device 29. Thus, the addition device 29 adds the multiplied results of the multiplication device 25 and the multiplication device 28. As a result, the interactive graphics plane 12 is combined with the combined result of the video plane 10 and the presentation graphics plane 11.

When opacity α=0, which represents no visible picture area, is set on the presentation graphics plane 11 and the interactive graphics plane 12, the plane below these planes can be displayed therethrough. For example, moving picture data that are displayed on the video plane 10 can be displayed in the background to the presentation graphics plane 11 and the interactive graphics plane 12.

The palette 22 and the RGB/YCbCr conversion circuit 30 may be together composed of one palette 22' so that it directly outputs YCbCr data.

The structure shown in FIG. 4 can be accomplished by any of hardware and software.

In the foregoing structure, a menu screen and buttons according to the reproduction-only standard can be displayed. When a button is selected on the menu screen, a play list according to the selected button can be reproduced. In addition, a function that superimposes a subtitle on a moving picture according to the reproduction-only standard is accomplished.

In the foregoing structure that combines the planes, since the number of video plane 10 is one, it is not expected that like picture-in-picture, two streams of moving picture data are treated in parallel and two screens of these two video signals are combined and displayed at the same time. Thus, it is difficult to accomplish the picture-in-picture with the foregoing structure.

Next, a first embodiment and a second embodiment of the present invention will be described. The final object of the present invention is to provide a format that allows the HD movie mode of the foregoing BD-ROM to be extended so that highly functional graphics can be rendered and user interactivity can be accomplished.

The standard of which the BD-ROM HD movie mode is extended is referred to as the full profile. The full profile is aiming to improve the BD-ROM functions so as to accomplish more complicated interactivity and network communications.

With respect to the plane structure, there are following three functions that are required in the full profile and that have not been accomplished by the BD-ROM HD movie mode:

(1) picture-in-picture function,
(2) function that reduces the size of moving picture data and displays the reduced moving picture data at a desired position in a display area, and
(3) function that displays a wallpaper in other than the area (background) to the moving picture data reduced by the function (2).

The "wallpaper" represents a picture with which the background to an object, for example a displayable area of the display, is filled. In many cases, for example, a relatively small picture is repeatedly displayed in a tile shape on the display. Of course, the wallpaper may be only one picture displayed in the whole displayable area of the display. Instead, the wallpaper may be a mono color or a gradation displayed on the display. Instead, the displayable region may not need to be filled with the wallpaper.

Figure 7A:
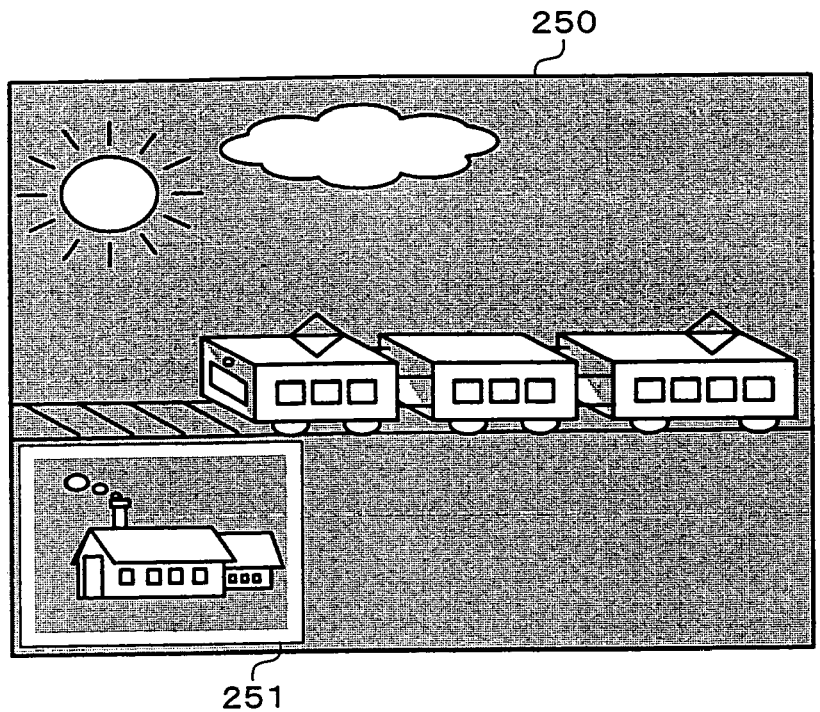
FIG. 7A and FIG. 7B are schematic diagrams describing a picture-in-picture.
Figure 7B:
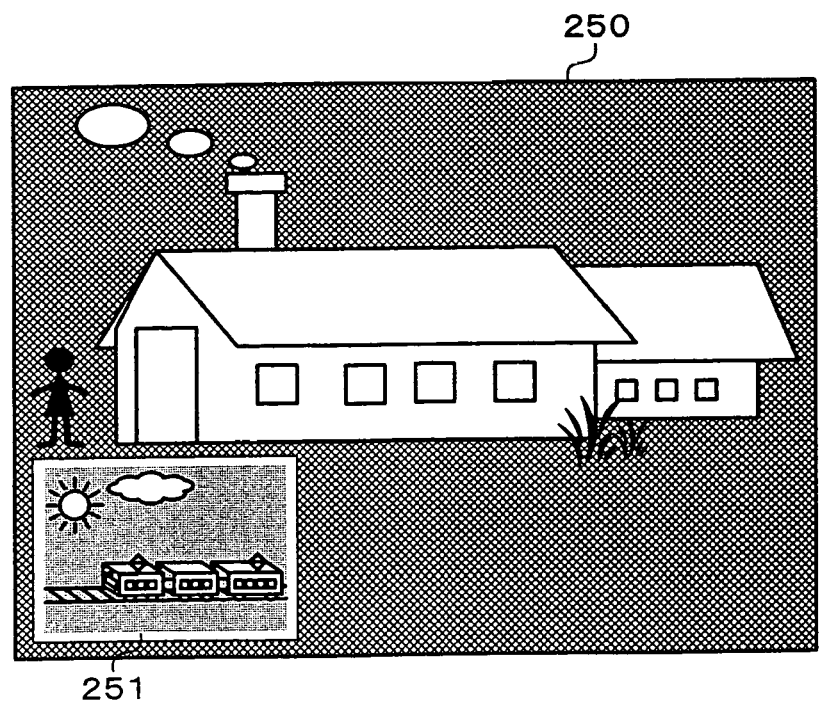

Next, with reference to FIG. 7A and FIG. 7B, the picture-in-picture as the function (1) will be described. The picture-in-picture is a function that displays two pictures in parallel in such a manner that while a picture is being reproduced, another picture is displayed in a small display area on the reproduction picture screen. In many cases, the other picture may be superimposed on the large picture. The large picture screen is referred to as a main screen, whereas the small picture screen superimposed on the main screen is referred to as a sub screen. In FIG. 7A, a sub screen 251 is displayed on a main screen 250. In FIG. 7A and FIG. 7B, a white frame around the sub screen 251 is displayed so that the picture on the sub screen 251 can be easily seen. Thus, whether the white frame is displayed and what frame is displayed depend on the disc creator's preference.

The sub screen 251 is superimposed with the main screen 250 as if the sub screen 251 were placed on the main screen 250. In the area of the sub screen 251, the main screen 250 is invisible. At this point, the picture-in-picture function can be preformed without need to perform the alpha-blending process for the sub screen 251. In addition, as shown in FIG. 7A and FIG. 7B, the picture-in-picture function needs to switch between the main screen 250 and the sub screen 251. In addition, it is preferred that the position and size of the sub screen 251 be changed for user's convenience.

First of all, the first embodiment of the present invention will be described. According to the first embodiment, to accomplish the foregoing (1) picture-in-picture function, (2) reduced picture display function, and (3) wallpaper picture display function, one plane is added to the plane structure of the BD-ROM HD movie mode described with reference to FIG. 2. Hereinafter, the plane that is added is referred to as the second video plane. The second video plane is placed behind the video plane. In other words, according to the first embodiment of the present invention, planes are placed in the order of the second video plane, the video plane, the presentation graphics plane, and the interactive graphics plane so that the second video plane is the bottommost plane and the interactive graphics plane is the topmost plane. With the video plane and the second video plane, the main screen 250 and the sub screen 251 are accomplished.

Figure 8:
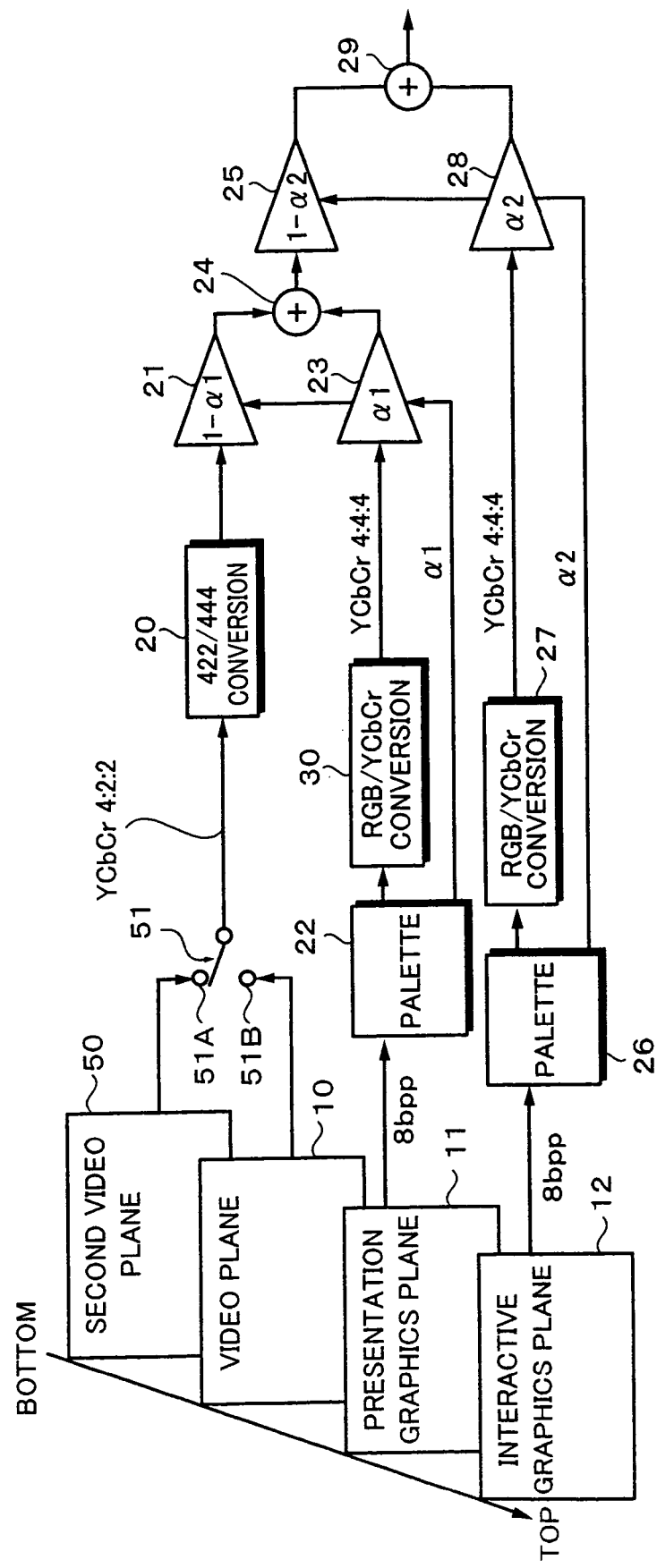
FIG. 8 is a functional block diagram showing an example of a structure that combines a second video plane, a video plane, a presentation graphics plane, and an interactive graphics plane.

FIG. 8 shows an example of a structure that combines a second video plane 50, a video plane 10, a presentation graphics plane 11, and an interactive graphics plane 12. In FIG. 8, similar sections to those of FIG. 4 are denoted by similar reference numerals and their description will be omitted.

As described above, alpha-blending is not required for the main screen 250 and the sub screen 251. Thus, each pixel needs to be displayed in the main screen 250 or the sub screen 251. Consequently, one of the video plane 10 and the second video plane 50 that display the main screen 250 and the sub screen 251, respectively, needs to be selected and displayed on a pixel-by-pixel basis.

Thus, as shown in FIG. 8, a switch 51 that selects one of outputs of the video plane 10 and the second video plane 50 is disposed. The switch 51 is controlled to select one of an input terminal 51A and an input terminal 51B on a pixel-by-pixel basis. For example, with a timing signal of the graphics section 303 shown in FIG. 1, switching timing of the switch 51 is controlled. The timing signal can be controlled by the CPU 301. Instead, the CPU 301 may control the switching timing of the switch 51. An output of the switch 51 is supplied to a 422/444 conversion circuit 20.

To execute the picture-in-picture function, after the size of moving picture data displayed on the sub screen 251 is reduced, the reduced moving picture data are stored in the video plane 10 or the second video plane 50. When the content of the main screen 250 and the content of the sub screen 251 are replaced with each other, the contents of the video plane 10 and the second video plane 50 are temporarily cleared and then new moving picture data are re-rendered.

The resolution and the number of displayable colors of the second video plane 50 may be the same as those of the video plane 10. Instead, when the picture-in-picture function has a restriction for example when the second video plane 50 is dedicated for the sub screen 251, it is necessary to satisfy the condition of which the resolution of the second video plane 50 suffices for the resolution of the sub screen 251.

Figure 9:
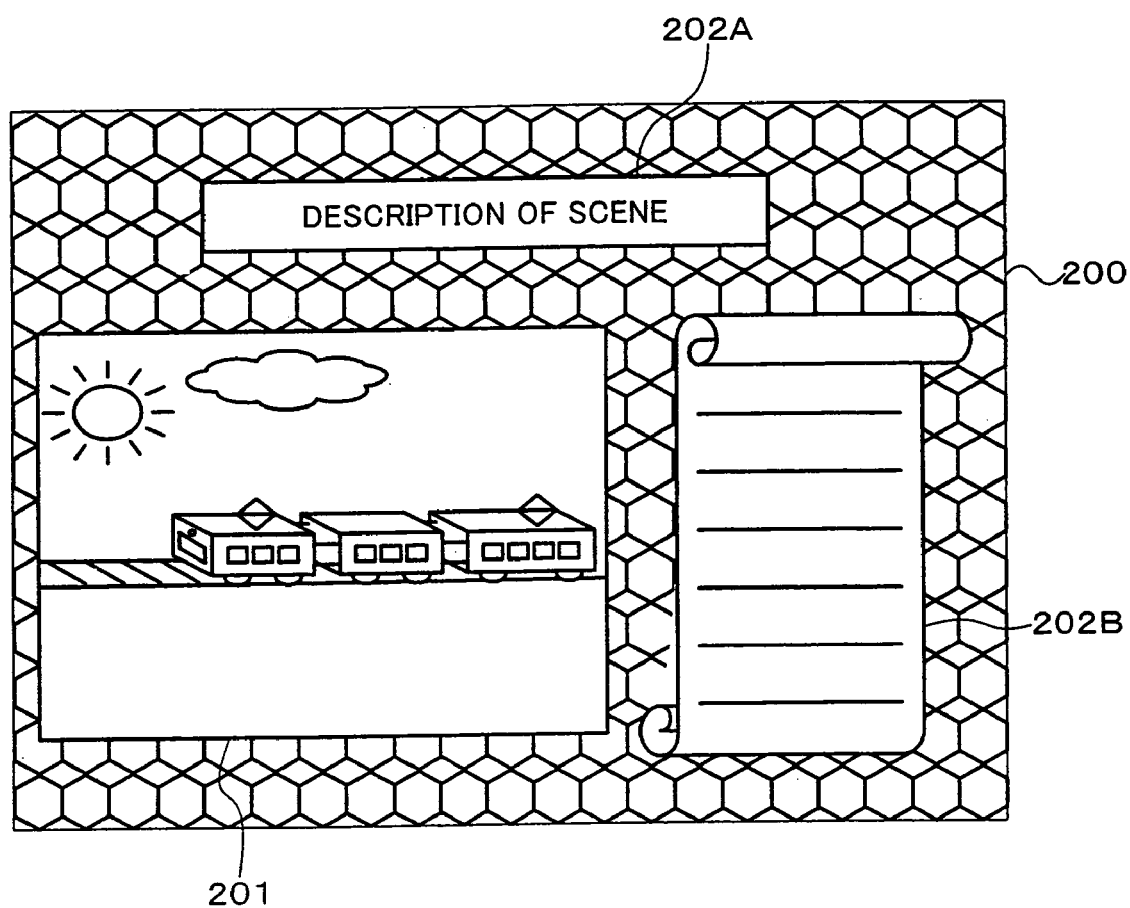
FIG. 9 is a schematic diagram showing an example of which a wallpaper picture is displayed with the second video plane.

According to the first embodiment of the present invention, with the second video plane 50, the wallpaper display function can be accomplished. FIG. 9 shows an example of which a wallpaper picture 200 is displayed with the second video plane 50. FIG. 9 shows that a moving picture 201 and GUI parts 202A and 202B are displayed in the background of the wallpaper picture 200.

The wallpaper picture 200 needs to satisfy at least the following three conditions.

(1) The wallpaper picture 200 is displayed on the bottommost plane in other planes.
(2) As the size of the moving picture 201 displayed on the video plane 10 is changed, the background to the reduced video plane 10 is filled with the wallpaper image 200.
(3) The wallpaper picture 200 is displayed in the background to the GUI parts displayed on the interactive graphics plane 12.

When the wallpaper picture 200 is displayed with the second video plane 50, these three conditions can be satisfied.

As described with reference to FIG. 8, the presentation graphics plane 11 is combined to the video plane 10 or the second video plane 50. The interactive graphics plane 12 is also combined to the combined picture. Thus, when predetermined opacities are set to the presentation graphics plane 11 and the interactive graphics plane 12, a plane behind these planes can be hidden or displayed. As a result, the wallpaper picture 200 can be displayed in the background to the parts 202A and 202B displayed on the interactive graphics plane 12. In other words, the wallpaper picture 200 can be displayed behind the presentation graphics plane 11 and the interactive graphics plane 12.

Since the switch 51 switches between the video plane 10 and the second video plane 50 on a pixel-by-pixel basis, the display area of the video plane 10 and the display area of the second video plane 50 have an exclusive relationship. Thus, as the size of the moving picture 201 displayed on the video plane 10 is changed, the area other than the moving picture 201 can be filled with the wallpaper image 200 on the second video plane 50. Thus, the moving picture 201 on the video plane 10 can be displayed as if the moving picture 201 were displayed in the background of the wallpaper picture 200 displayed on the second video plane 50. As a result, the wallpaper picture 200 on the second video plane 50 can be displayed as if the wallpaper image 200 were displayed on the bottommost plane of all the planes.

In the foregoing description, the switch 50 switches between these planes on a pixel-by-pixel basis. Instead, the switch 50 may switch between these planes on the basis of every a plurality of pixels for example every two pixels or every three pixels.

Next, the second embodiment of the present invention will be described. According to the second embodiment, the picture-in-picture and the background wallpaper display are accomplished without need to add a plane to the structure shown in FIG. 4.

First of all, a method of accomplishing the wallpaper picture display will be described. According to the second embodiment, like the BD-ROM HD movie mode described with reference to FIG. 2, planes are placed in the order of the video plane 10, the presentation graphics plane 11, and the interactive graphics plane 12 so that the video plane 10 is the bottommost plane and the interactive graphics plane 12 is the topmost plane. The structure that combines each plane is the same as that shown in FIG. 4.

Figure 10:
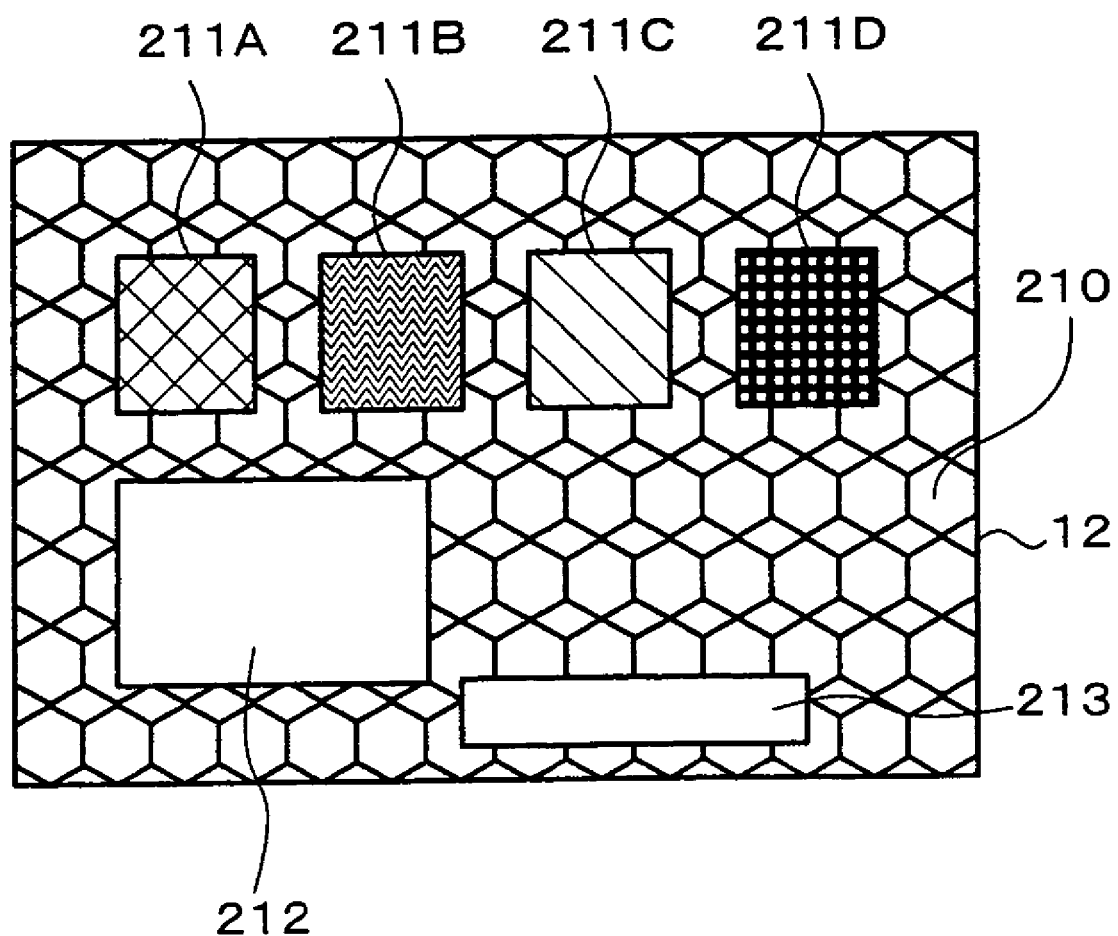
FIG. 10 is a schematic diagram describing a method of accomplishing a wallpaper picture display according to a second embodiment of the present invention.

Next, with reference to FIG. 10, the second embodiment of the present invention will be described. In the example shown in FIG. 10, a plurality of button images, namely GUI parts 211A, 211B, 211C, and 211D, of the interactive graphics plane 12, are displayed in the background of a wallpaper picture 210. A moving picture of the video plane 10 and for example subtitle data of the presentation graphics plane 11 are displayed in an area 212 and an area 213, respectively. In addition, the wallpaper picture 210 is displayed in the area other than the parts 211A, 211B, 211C, and 211D, the area 212, and the area 213.

To display these parts, areas, and wallpaper image 210, the opacity α2 of the areas 212 and 213 of the topmost interactive graphics plane 12 is set to 0 so that the two planes behind the interactive graphics plane 12 become visible. The opacity α2 of other than the areas 212 and 213 is set to for example 1 so that the wallpaper picture 210 is displayed and the parts 211A, 211B, 211C, and 211D are displayed. The wallpaper picture 210 is rendered in the area other than the areas 212 and 213 and the parts 211A, 211B, 211C, and 211D.

The opacity α1 of the area 212 of the presentation graphics plane 11 is set to 0 so that the video plane 10 behind the presentation graphics plane 11 becomes fully visible. The opacity α1 of other than the area 212 is set to for example 1. Instead, the opacity α1 of the area 213 for subtitle data of the presentation graphics plane 11 may be set to 1 and the opacity α1 of the other areas of the presentation graphics plane 11 may be set to 0.

As shown in FIG. 11, reduced video data 216 of which the size of a moving picture is reduced are generated so that the reduced video data 216 are fitted to the area 212. In addition, the reduced video data 216 are placed at the position of the area 212. Thus, the wallpaper picture 210 can be displayed without need to add a new plane to the structure shown in FIG. 2 and FIG. 4.

An algorithm and a program that obtain an area for which the wallpaper picture 210 is rendered may be provided as a library of a programming language. Thus, the disc creator does not need to consider the algorithm and program.

In addition, according to the second embodiment of the present invention, when the wallpaper picture 210 is rendered, the area other than the areas 212 and 213 and the parts 211A, 211B, 211C, and 211D needs to be obtained. When the wallpaper picture 210 is rendered, a process with a large calculation amount is required. Thus, when there is a GUI part that moves or deforms on the interactive graphics plane 12 as time elapses, the operation speed may slow down in proportion with the increase of the calculation amount. Thus, when such GUI parts are used, this point should be considered.

Next, a method of accomplishing the picture-in-picture according to the second embodiment will be described. FIG. 12 shows an example of a structure that accomplishes the picture-in-picture with one video plane 10. As shown in FIG. 12, according to the second embodiment, two frame buffers 221A and 221B are disposed between a video output section 220 and a video plane 10.

An output of the frame buffer 221A is supplied to an input terminal 223A of a switch 223 through a down converter 222A. An output of the frame buffer 221B is supplied to an input terminal 223B of the switch 223 through a down converter 222B. The switch 223 can switch between the input terminal 223A and the input terminal 223B on a pixel-by-pixel basis. An output of the switch 223 is supplied to the video plane 10.

The frame buffers 221A and 221B are not plane memories (for example, the VRAM 304) that store video data just corresponding to a picture displayed on the display, but a part of a main memory that the CPU has or a frame buffer disposed downstream of a video decoder. The frame buffers 221A and 221B correspond to for example the DRAM 302 shown in FIG. 1.

The video output section 220 can process two different video streams (referred to as the video stream A and the video stream B). The video stream A and the video stream. B that have been output from the video output section 220 are supplied to the frame buffer 221A and the frame buffer 221B, respectively. In the following description, it is assumed that the video stream A and the video stream B are displayed as a main screen and a sub screen thereof, respectively.

Video data that have been read from the frame buffer 221B are supplied to the down converter 222B. The down converter 222B changes the size of the video data. The down converter 222B performs a thin-out process and an interpolation process for pixels so as to reduce the size of the video data. The reduced video data that have been reduced by the down converter 222B are supplied to the input terminal 223B of the switch 223.

On the other hand, video data that have been read from the frame buffer 221A are supplied to the input terminal 223A of the switch 223 through the down converter 222A. However, in this case, the down converter 222A does not operate. Like the down converter 222B, the down converter 222A reduces the size of the input video data.

The switch 223 switches between the input terminals 223A and 223B as video data are transferred from the upper end of the display area to the lower end thereof from the left to the right of the video plane 10. In the example shown in FIG. 12, when pixels of the positions of the sub screen 230 are written, the switch 223 switches to the input terminal 223B. As a result, moving picture data that have been read from the frame buffer 221B are rendered at a part of the video plane 10 as the sub screen 230.

Next, with reference to FIG. 13A, FIG. 13B, FIG. 13C, and FIG. 13D, an example of the switching timing of the switch 223 will be described. In FIG. 13B, FIG. 13C, and FIG. 13D, for simplicity, as shown in FIG. 13B, it is assumed that the resolution of the screen (one frame) is 20 pixels×10 lines. In addition, it is assumed that the sub screen 230 is displayed at a position as shown in FIG. 13A. FIG. 13C shows an example of the switching timing of the switch 223 at this point. In FIG. 13C, the buffer A represents the frame buffer 221A, namely the input terminal 223A, whereas the buffer B represents the frame buffer 221B, namely the input terminal 223B. Thus, for lines that do not belong to the sub screen 230, the input terminal 223A is selected. For lines that belong to the sub screen 230 and for pixels that do not belong to the sub screen 230, the input terminal 223A is selected. For lines and pixels that belong to the sub screen 230, the input terminal 223B is selected. When the switching timing of the switch 223 is controlled on a pixel-by-pixel basis, the main screen and the sub screen 230 can be simultaneously displayed on one video plane 10.

The switching timing control of the switch may be applied to a sub screen display control of the video plane 10 and the second video plane 50 according to the first embodiment of the present invention.

In the foregoing example, the shape of the sub screen 230 is rectangular. Instead, when the switching control of the switch 223 is performed on a pixel-by-pixel basis, the sub screen 230 may have any shape other than rectangle.

Next, a process of replacing the content of the sub screen 230 with the content of the main screen will be described. In this case, video data that have been read from the frame buffer 221B is supplied to the input terminal 223B of the switch 223 through the down converter 222B. In this case, the down converter 222B does not operate. On the other hand, the size of video data that have been read from the frame buffer 221A is reduced by the down converter 222A and then the reduced video data are supplied to the input terminal 223A of the switch 223. As exemplified in FIG. 13D, when an instruction that causes the contents of the sub screen 230 and the main screen to be replaced with each other is issued at timing T, the selection direction of the switch 223 is changed between the input terminal 223A and the input terminal 223B.

When the switch 223 is controlled as shown in FIG. 13D, after a pixel corresponding to timing T, the contents of the sub screen 230 and the main screen are placed with each other. The switching timing is not limited to this example. Instead, when an instruction that causes the sub screen and the main screen to be replaced with each other is issued at timing T, after the current frame ends, after the next frame starts, or after the current frame ends until the next frame starts, the switching timing of the switch 223 may take place. In this example, with respect to frames that are read after the instruction that causes the sub screen and the main screen to be replaced with each other has issued, the contents of the sub screen 230 and the main screen are placed with each other.

In the foregoing example, the contents of the sub screen 230 and the main screen are replaced with each other by the switching control of the switch 223. However, the present invention is not limited to this example. Instead, one of the frame buffer 221A and the frame buffer 221B may be dedicated to the sub screen 230. The output of the video output section 220 may be switched between the frame buffers 221A and 221B. In this case, when the main screen and the sub screen are replaced with each other, it is not necessary to change the switching timing of the switch 223.

In the foregoing example, the switching timing of the switch 223 is controlled on a pixel-by-pixel basis. Instead, the switching timing of the switch 223 may be controlled every a plurality of pixels, for example every two pixels or every four pixels.

In the foregoing example, video data stored in the frame buffers 221A and 221B are scanned on a line-by-line basis and transferred to the video plane 10. The present invention is not limited to this example. For instance, video data may be read from the frame buffers 221A and 221B on a block-by-block basis, each of which is composed of a predetermined area and then transferred to the video plane 10. In this case, the switching timing of the switch 223 is controlled on a block-by-block basis.

As with the first embodiment of the present invention, when a plane is added, a plane memory (for example, the VRAM 304) and hardware that accesses the plane memory are needed. Thus, this method is suitable for a system that uses a CPU whose process speed is not high and that has hardware extensibility. For example, the method that uses an additional plane is suitable for the BD-ROM reproduction-only apparatus.

When a system that has a CPU whose process speed is very high and a dedicated LSI (Large-Scale Integration) that dedicatedly renders graphics at very high speed, since the hardware (in particular, graphics rendering hardware) tends to be customized, it is difficult to extend the hardware. In this system, it can be said that as with the second embodiment of the present invention, after the position, size, and combined order of each GUI part are calculated, all of the GUI parts are rendered on one plane. For example, this method is suitable for a general-purpose computer apparatus or the like that reproduces data from the BD-ROM.

Figure 14B:
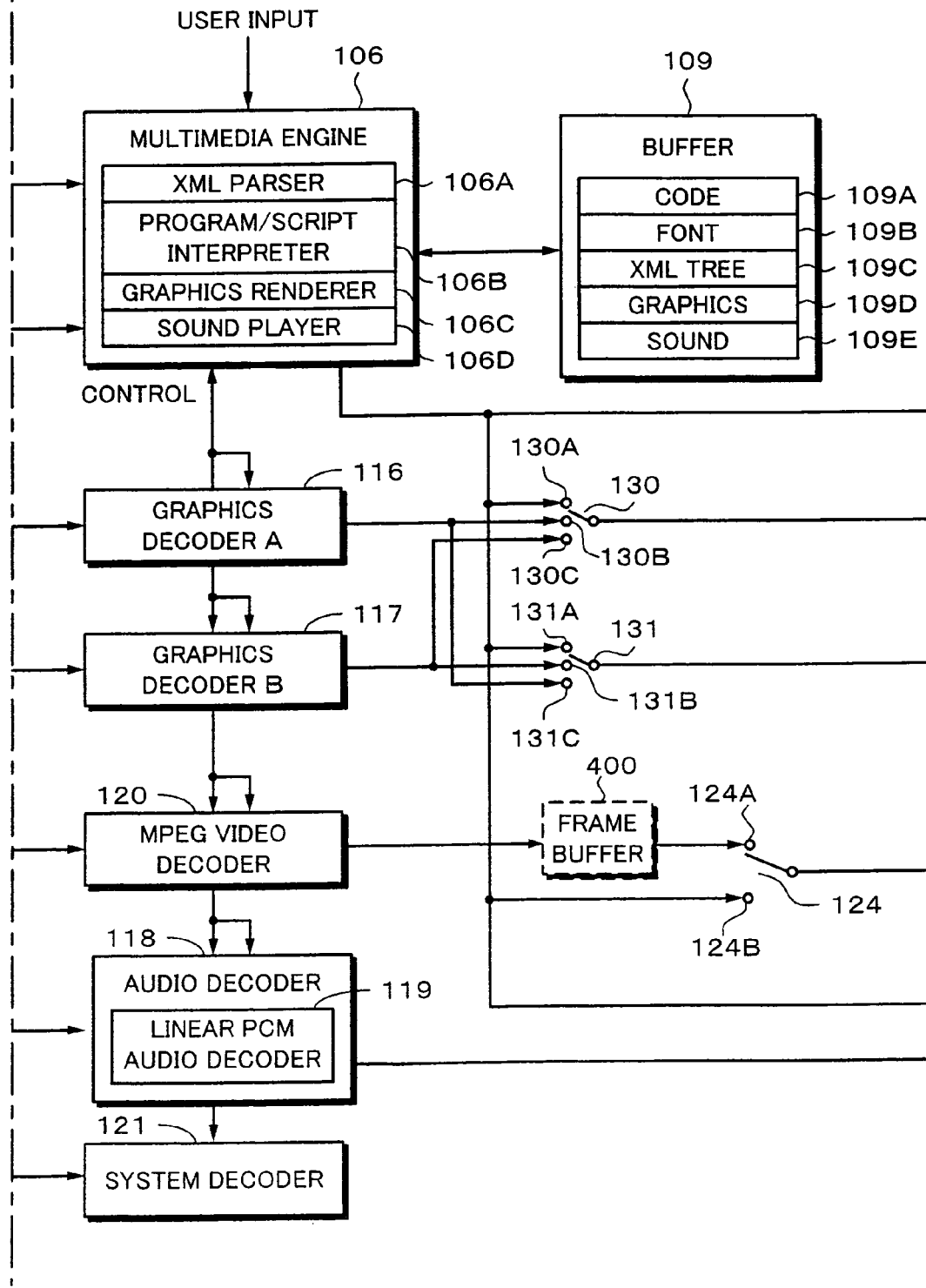
Figure 14C:
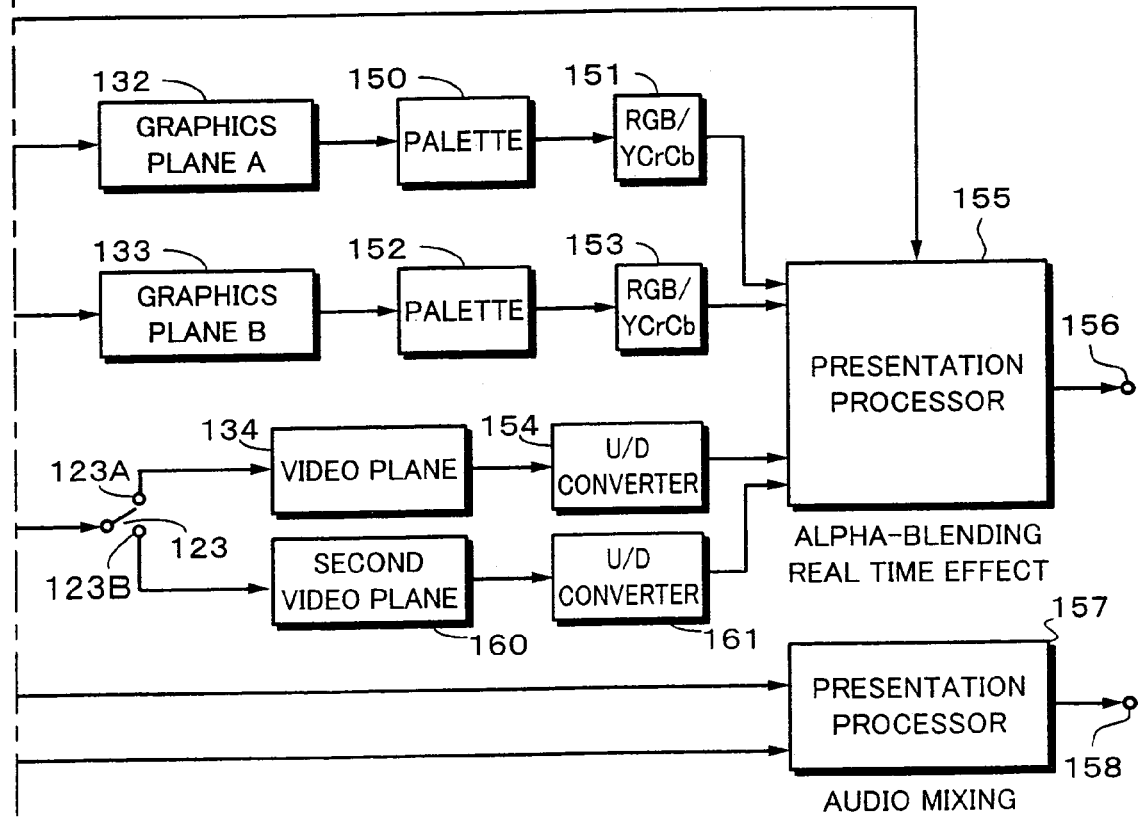

Next, a player-decoder 100 according to the first embodiment and the second embodiment will be described. FIG. 14A, FIG. 14B, and FIG. 14C are a functional block diagram that shows an example of the structure of the player-decoder 100 according to the first embodiment of the present invention. The player-decoder 100 can be applied to the second embodiment of the present invention with almost similar structure. When necessary, the structure of the player-decoder 100 according to the second embodiment will be described.

The player-decoder 100 interprets data reproduced from a disc loaded into a drive device (not shown), outputs an AV (Audio/Video) stream, and allows the user to interactively operate the output AV stream.

The overall operations of the player-decoder 100 are controlled by a CPU (not shown). Streams and data flow of the individual sections of the player-decoder 100 are monitored and controlled by the CPU.

When a disc is loaded into the drive device (not shown) in the BD-ROM HD movie mode, a file that represents a reproduction order of play lists (for example, file name "scenario.hdmv") and a file that represents the first play list of a play list group that composes a menu and a title (for example, file name "entrylist.data"). According to the codes of the file "scenario.hdmv" and file "entrylist.data," other necessary files are read from the disc and contents recorded on the discs are reproduced.

According to the codes of the file "scenario.hdmv" and the file "entrylist.data," moving picture data that are displayed on the video plane 10 and the second video plane 50, video data that are displayed on the presentation graphics plane 11, the interactive graphics plane 12, and the second video plane 50, play list files, and so forth are read from the disc. In the full profile, a file that contains a program is read from the disc and the program is executed.

In the following description, among data that have been read from a disc, streams that need to be successively processed, for example moving picture data, sub pictures (subtitle data), and audio data, are referred to as real time streams. In contrast, non-real time data that need not to be successively processed, for example a scenario file, a play list file, a script file, a program file, a part of a moving picture, a still picture, and sound data, are referred to as store objects. A store object is stored, expanded, and when necessary processed in a memory.

The player-decoder 100 has two input channels that are channels (1) and (2). A store object is input to an input terminal 101 of the input channel (1). A real time stream is input to an input terminal 202 of the input channel (2). Instead, a store object may be input to the input terminal 202. According to the first and second embodiments, real time streams and a part of store objects that have been input to the input terminal 202 are for example an MPEG2 TS (Moving Pictures Experts Group 2 Transport Stream).

A real time stream that is input to the input terminal 202 is not limited to an MPEG2 TS. As long as a real time stream that is input to the input terminal 202 is transmitted on a packet-by-packet basis and can multiplex video data, audio data, still picture data, and so forth, another format stream may be input. In this case, a PID filter 110 that will be described later is used as a demultiplexer according to the stream format to demultiplex the stream into video data, audio data, still picture data, and so forth.

When the disc rotation speed of the drive device is increased for example two times, the read and transfer rate of data that are read from the disc is increased, and the drive device is time-division operated, data of two channels (1) and (2) can be read from the disc.

Firstly, the system of the input channel (1) will be described. A store object that is input to the input terminal 101 is input to a switch circuit 102. When a program code of such as an ECMA (European. Computer Manufacturers Association) script, an HTML (Hyper Text Markup Language) file (or an XHTML file), or a Java file is input as a store object, an output terminal 102A of the switch circuit 102 is selected and the input program code is stored in a code buffer 104.

On the other hand, when video data are input as a store object, an output terminal 102B of the switch circuit 102 is selected and the input video data are input to a switch circuit 103. When a real time stream that is input to the input terminal 202 does not contain video data that are displayed on the presentation graphics plane 11 or the interactive graphics plane 12, an input terminal 103A of the switch circuit 103 is selected and video data that have been input from the switch circuit 102 are stored in a content buffer 105.

Likewise, when a real time stream that is input to the input terminal 202 contains video data that are displayed on the presentation graphics plane 11 or the interactive graphics plane 12, an input terminal 103B of the switch circuit 103 is selected and the video data are stored in the content buffer 105. When necessary, store objects stored in the code buffer 104 and the content buffer 105 are read and supplied to a multimedia engine 106.

Video data of a store object stored in the content buffer 105 are also supplied to a graphics decoder A 116 and a graphics decoder B 117 through switch circuits 107 and 108, respectively.

The multimedia engine 106 contains an XML parser 106A, a program/script interpreter 106B, and a graphics renderer 106C. In addition, the multimedia engine 106 has a sound player 106D to handle audio data. The multimedia engine 106 may be composed of independent hardware. Instead, the multimedia engine 106 may be accomplished by a process that is executed by the CPU (not shown) according to a predetermined program.

The XML parser 106A has a function that parses an HTML document and an XHTML document as well as an XML (Extensible Markup Language) document. An HTML document or an XHTML document parsed by the XML parser 106A is converted into a format executable by the player-decoder 100. The program/script interpreter 106B analyzes a Java (registered trademark) program, an ECMA script, and so forth and converts it into a format executable by the player-decoder 100. The graphics renderer 106C decodes video data into a format expandable to the subtitle plane 11 and the graphics plane 12.

In the multimedia engine 106, the XML parser 106A, the program/script interpreter 106B, and the graphics renderer 106C perform their processes using a buffer 109 as a work memory. The XML parser 106A and the program/script interpreter 106B use for example a code buffer 109A of the buffer 109. The graphics renderer 106C uses a graphics buffer 109D of the buffer 109. In addition to the foregoing code buffer 109A and graphics buffer 109D, the buffer 109 includes a font buffer 109B that stores font data used to display a character string, a tree buffer 109C that holds parsed results of an HTML document by the XML parser 106A in a hierarchical tree structure, a sound buffer 109E that stores audio data used in a sound player 106D.

The multimedia engine 106 for example reads an ECMA script from the code buffer 104, when necessary, reads another ECMA script and an HTML document (or an XHTML document) from the code buffer 104 according to the ECMA script that has been read, and reads video data from the content buffer 105. Data stored in the code buffer 104 and the content buffer 105 can be held therein until the data become unnecessary. Thus, when necessary, data stored in the code buffer 104 and the content buffer 105 can be read and used any times.

In addition, the multimedia engine 106 performs a demultiplex process for a plurality of types of input data, a JavaVM (Java Virtual Machine) function, and so forth. In addition, the multimedia engine 106 receives user's inputs from a remote control commander, a pointing device, and so forth, and properly processes them. The user's inputs are supplied to the graphics decoder A 116, the graphics decoder B 117, an audio decoder 118, an MPEG video decoder 120, and a system decoder 121.

Video data processed in the graphics renderer 106C are supplied to a graphics plane A 132 and a graphics plane B 133 through switch circuits 130 and 131, respectively. In this example, video data supplied to the graphics plane A 132 and the graphics plane B 133 have for example PNG format, run-length format, and JPEG format, but not limited thereto. Timing at which video data are supplied to the planes 132 and 133 is controlled by the multimedia engine 106.

The graphics plane A 132 and the graphics plane B 133 correspond to the foregoing presentation graphics plane 11 and interactive graphics plane 12, respectively. A video plane 134 corresponds to the foregoing video plane 10. A second video plane 160 corresponds to the foregoing second video plane 50. The graphics plane A 132, the graphics plane B 133, the video plane 134, and the second video plane 160 are for example frame memories for which the VRAM 304 shown in FIG. 1 may be used.

The multimedia engine 106 also supplies control signals to a presentation processor 155 that will be described later to switch between the video plane 134 and the second video plane 160 and between the graphics plane A 132 and the graphics plane B 133, and to perform the alpha-blending. Likewise, the multimedia engine 106 supplies a control signal to a presentation processor 157 that will be described later to control the output of an audio stream.

Next, the system of the input channel (2) will be described. A real time stream that is input as an MPEG2 TS to the input terminal 202 is supplied to the PID filter 110. The PID filter 110 extracts a PID (Packet Identification) from a transport packet of the MPEG2 TS and detects the attribute of the stream from the transport packet. According to the attribute of the stream, the PID filter 110 categorizes the input real time stream as systems for each transport packet.

When the PID indicates that the current transport packet is a packet that contains video data categorized as a store object, the transport packet is temporarily stored in a buffer TBn 111A. The transport packet is read from the buffer TBn 111A at predetermined timing, input to the input terminal 103B of the switch circuit 103, and stored in the content buffer 105 through the switch circuit 103.

When the PID extracted by the PID filter 110 indicates that the current transport packet is a packet that contains subtitle data, the transport packet is temporarily stored in a buffer TBn 111B and a buffer Bn 112B, read from the buffers at predetermined timing, input to an input terminal 107B of the switch circuit 107, and supplied to the graphics decoder A 116 through the switch circuit 107.

The graphics decoder A 116 removes header information from the supplied transport packet, decodes subtitle data contained in the transport packet, and obtains video data of the subtitle. The video data are input to an input terminal 130B of the switch circuit 130 at predetermined timing, and expanded on the graphics plane A 132 through the switch circuit 130. In addition, the video data may be expanded on the graphics plane B 133 through the switch circuit 131.

When the PID extracted by the PID filter 110 indicates that the current transport packet is a packet that contains graphics data, the transport packet is temporarily stored in a buffer TBn 111C and a buffer Bn 112C, read at predetermined timing, input to an input terminal 108B of the switch circuit 108, and supplied to the graphics decoder B 117 through the switch circuit 108.

The graphics decoder B 117 removes header information from the supplied transport packet, decodes graphics data contained in the transport packet, and obtains the graphics data. Video data as the graphics data are input to an input terminal 131B of the switch circuit 131 at predetermined timing and expanded on the graphics plane B 133 through the switch circuit 131. In addition, the video data may be expanded on the graphics plane A 132 through the switch circuit 130.

The function of the graphics decoder A 116 is not different from the function of the graphics decoder B 117. In other words, there are two systems of graphics decoders that independently operate. In other words, it is expected that subtitle data and graphics data can be independently decoded. In implementation, one high speed graphics decoder may be time-shared as two virtual graphics decoders.

When the PID extracted by the PID filter 110 indicates that the current transport packet is a packet that contains audio data, the transport packet is temporarily stored in a buffer TBn 111D and a buffer Bn 112D, read at predetermined timing, and supplied to the audio decoder 118. The audio data contained in the transport packet has been compression-encoded according to for example the MPEG system.

The audio decoder 118 also has for example a linear PCM (Pulse Code Modulation) audio decoder 119. The audio decoder 118 removes header information from the input transport stream, decodes compression-encoded audio data contained in the transport packet, and obtains linear PCM audio data.

Linear PCM audio data that have been output from the audio decoder 118 are input to the audio presentation processor 157. The presentation processor 157 adds a predetermined effect sound to the linear PCM audio data under the control of the multimedia engine 106. The resultant audio data are output from an output terminal 158.

When the PID extracted by the PID filter 110 indicates that the current transport packet is a packet that contains moving picture data, the transport packet is temporarily stored in a buffer TBn 111E, a buffer MBn 113, and a buffer EBn 114, read from these buffers at predetermined timing, and supplied to the MPEG video decoder 120. The moving picture data contained in the transport packet has been compression-encoded according to the MPEG2 system.

The MPEG video decoder 120 removes header information from the supplied transport packet, decodes the moving picture data that have been compression-encoded according to the MPEG2 system, and obtains baseband moving picture data.

Moving picture data that have been output from the MPEG video decoder 120 are input to an input terminal 124A of the switch circuit 124. The switch circuit 124 selects moving picture data that have been output from the MPEG video decoder 120 or moving picture data that have been output from the multimedia engine 106. Moving picture data that are selected at predetermined timing are input to a switch 123. The switch 123 selects a video plane to which moving picture data are expanded. The moving picture data are expanded on the video plane 134 or the second video plane 160.

According to the first embodiment and the second embodiment of the present invention, the picture-in-picture function can be accomplished. To perform the picture-in-picture function, it is necessary to supply two streams of moving picture data. For example, an MPEG2 TS that contains two streams of moving picture data is supplied from the input terminal 202 and supplied to the MPEG video decoder 120 through the PID filter 110, the buffer TBn 111E, the buffer MBn 113, and the buffer EBn 114. The MPEG video decoder 120 decodes the two streams of moving picture data and outputs decoded two streams of moving picture data.

The two streams of moving picture data that have been output from the MPEG video decoder 120 may be directly supplied to the switch 124. Instead, as represented by a dot line block shown in FIG. 14B, a frame buffer 400 that has a capacity for at least two frames of moving picture data may be disposed between the MPEG video decoder 120 and the switch 124 so as to temporarily store the two streams of moving picture data that have been output from the MPEG video decoder 120. With the frame buffer 400, two streams of moving picture data can be independently output for example on a frame-by-frame basis. As a result, the load of the switch 123 can be lightened.

The supply for the two streams of moving picture data is not limited to this example. Instead, one stream of moving picture data may be supplied as a real time stream from the input terminal 202. The other stream of moving picture data may be supplied as a store object from the input terminal 101. In addition, two types of pictures used in the picture-in-picture function do not need to be moving picture data. Instead, one of the two types of pictures may be still picture data. Instead, both of the two types of pictures may be still picture data.

In the player-decoder 100 according to the first embodiment of the present invention, with the picture-in-picture function, when one of moving picture data of the video plane 134 and moving picture data of the second video plane 160 is used as a sub screen, moving picture data displayed on the sub screen is pre-reduced and expanded on the video plane 134 or the second video plane 160. The MPEG video decoder 120 may have a function that reduces the size of moving picture data. Of course, a reduced picture generation section that generates a reduced picture may be disposed between the MPEG video decoder 120 and the video plane 134 (the second video plane 160).

When the player-decoder 100 is applied to the second embodiment of the present invention, the second video plane 160 and the switch circuit 123 are omitted. In addition, the frame buffer 400 is disposed between the MPEG video decoder 120 and for example the switch circuit 124 as represented by a dot line block shown in FIG. 14B. The frame buffer 400 has a storage capacity for at least two frames of moving picture data.

Next, with reference to FIG. 12, an example of a process according to the second embodiment of the present invention will be described. The frame buffer 221A and the frame buffer 221B are formed in different areas of the frame buffer 400 (in this example, these frame buffers are referred to as a frame memory area 221A and a frame memory area 221B). Of course, frame buffers 400A and 400B (not shown) may be disposed corresponding to the frame buffers 221A and 221B, respectively.

On the other hand, two streams of moving picture data that have been output from the MPEG video decoder 120 are supplied to the frame buffer 400 and stored in the Frame memory areas 221A and 221B, respectively.

When moving picture data stored in the frame memory area 221B are used as a sub screen, the moving picture data stored in the frame memory area 221B are reduced by the down converter 222B (not shown). The reduction process can be preformed for example by thinning out pixels that have been read from the frame memory area 221B in a predetermined manner. Moving picture data stored in the frame memory area 221A and the frame memory area 221B of the frame buffer 400 are read under the switching control of the switch 223 on a pixel-by-pixel basis. The moving picture data that have been read from the frame buffer 400 are supplied to the video plane 134. Thus, in the player-decoder 100 according to the second embodiment of the present invention, the picture-in-picture function with one video plane 134 can be accomplished.

When the PID extracted by the PID filter 110 indicates that the current transport packet is a packet that contains system information, the transport packet is supplied to the system decoder 121 through a buffer TBn 111F and buffer Bsys 115. The system decoder 121 removes header information from the supplied transport packet and obtains system information from the transport packet. The system information is supplied to the CPU (not shown).

Video data on the graphics plane A 132 are supplied to a palette 150 that corresponds to the palette 22. The palette 150 has 256 colors. The palette 150 is referenced with an index. As a result, the palette 150 outputs RGB data and extracts the opacity data α1 from the video data. The RGB data is converted into YCbCr data by an RGB/YCbCr conversion circuit 151 that corresponds to the foregoing RGB/YCbCr conversion circuit 29. The YCbCr data and the opacity data α1 are supplied to the presentation processor 155.

Video data of the graphics plane B 133 are supplied to a palette 152 that corresponds to the foregoing palette 26. The palette 152 has 256 colors. The palette 152 is referenced with an index. As a result, the palette 152 outputs RGB data and extracts the opacity data α2 from the video data. The RGB data are converted into YCbCr data by an RGB/YCbCr conversion circuit 153 that corresponds to the foregoing RGB/YCbCr conversion circuit 27. The YCbCr data and the opacity data α2 are supplied to the presentation processor 155.

An output of the video plane 134 is supplied to the presentation processor 155 through an up/down converter 154. Likewise, an output of the second video plane 160 is supplied to the presentation processor 155 through an up/down converter 161.

The up/down converter 154 is a circuit that converts the resolution of a picture. The up/down converter 154 converts for example a high resolution HD (High Definition) picture into a standard resolution SD (Standard Definition) picture.

The presentation processor 155 performs an alpha-blending process with the opacity α1 of video data of the presentation graphics plane 11 (graphics plane A 132) and the opacity α2 of the interactive graphics plane 12 (graphics plane B 133) that were described with reference to FIG. 4 or FIG. 8. When the player-decoder 100 is applied to the first embodiment of the present invention and the picture-in-picture function and the wallpaper display function are used, the presentation processor 155 performs the switching process of the outputs of the video plane 10 and the second video plane 50 on a pixel-by-pixel basis.

In other words, the presentation processor 155 causes the switch 51 (not shown) to switch between video data of the video plane 134 and video data of the second video plane 160, composes data of one picture, and combines the composed video data and the video data of the graphics plane A 132 according to the opacity data α1 of the video data of the graphics plane A 132. In addition, the presentation processor 155 combines the combined video data of the video plane and the graphics plane A 132 and the video data of the graphics plane B 133 according to the opacity α2 of the video data of the graphics plane B 133. The combined video data of which the video data of the graphics plane B 133, the video data (subtitle data) of the graphics plane A 132, and the combined video data of the video plane 134 and the second video plane 160 have been combined are output from an output terminal 156.

The presentation processor 155 may perform an effect process for video data in real time.

In the foregoing example, each section of the player-decoder 100 is composed of hardware. However, the present invention is not limited to that example. For example, the player-decoder 100 may be accomplished by a process of software. In this case, the player-decoder 100 may be operated on a computer device. Instead, the player-decoder 100 may be accomplished by a combination of hardware and software. For example, the audio decoder 118 and the MPEG video decoder 120 may be composed of hardware and the other sections may be composed of software.

When the player-decoder 100 is composed of only software or by a combination of hardware and software and the player-decoder 100 is executed by a computer device, a program that causes the computer device to execute the player-decoder 100 is provided as for example a CD-ROM (Compact Disc-Read Only Memory). When the CD-ROM is loaded into a CD-ROM drive of the computer device and the program recoded on the CD-ROM is installed to the computer device in a predetermined manner, the foregoing process can be executed by the computer device. Since the structure of the computer device is well known, the description will be omitted.

According to the present invention, two streams of moving picture data reproduced form the record medium are stored in respective memories. One of the two streams of moving picture data stored in the memories is selected, output, and displayed on a predetermined area-by-area basis. Thus, when one of the two streams of moving picture data is reduced moving picture data, the non-reduced moving picture data and the reduced moving picture data can be exclusively displayed on one screen. As a result, the picture-in-picture function can be accomplished.

When wallpaper picture data are used instead of non-reduced moving picture data, a wallpaper picture can be displayed in the background of the reduced moving picture data.

In addition, since one of two streams of moving picture data stored in memories is selected on a predetermined area-by-area basis, when the size of the reduced moving picture data is changed, the resized reduced moving picture data can be correspondingly displayed.

In addition, according to the first embodiment of the present invention, the second video plane is added to the plane structure of the BD-ROM HD movie mode. One of the outputs of the video plane and the second video plane is selected and output on a predetermined area-by-area basis. Thus, when reduced moving picture data are stored in the second video plane and one of the outputs of the video plane and the second video plane is selected corresponding to a display position of the reduced moving picture data, the picture-in-picture function can be accomplished.

At this point, when wallpaper picture data are stored in the video plane, a wallpaper picture can be displayed in the background of the reduced moving picture data.

In addition, since one of the outputs of the video plane and the second video plane is selected on a predetermined area-by-area basis, when the size of the reduced moving picture data stored in for example the second video plane is changed, the resized reduced moving picture data can be correspondingly displayed.

In addition, according to the second embodiment of the present invention, two frame buffers are disposed upstream of the video plane with the plane structure of the BD-ROM HD movie mode. One of the outputs of the two frame buffers is selected and output on a predetermined area-by-area basis and supplied to the video plane. Thus, moving picture data read from one frame buffer are reduced as reduced moving picture data. Corresponding to the display position of the reduced moving picture data, one of the outputs of the reduced moving picture data and the other frame buffer is selected. As a result, with one video plane, the picture-in-picture function can be accomplished.

Since one of the outputs of the two frame buffers is selected on a predetermined area-by-area basis, when the size of the reduced moving picture data read from one frame buffer is changed, the resized reduced moving picture data can be correspondingly displayed.

In addition, according to the second embodiment of the present invention, the output of the video plane for reduced moving picture data and the output of the presentation graphics plane for subtitle data are combined. The output of the interactive graphics plane for video data such as GUI parts and the combined output are combined. When the output of the interactive graphics plane for video data such as GUI parts and so forth and the combined result of the video plane and the presentation graphics plane are combined, on the interactive graphics plane, an area corresponding to the display position of the reduced video data on the video plane is designated as a transparent area and the other area of the interactive graphics plane is designated as an area for a wallpaper picture. As a result, the wallpaper picture can be displayed in the background of the reduced moving picture data without need to add a new plane to the plane structure of the BD-ROM HD movie mode.

When the output of the interactive graphics plane and the combined result of the video plane and the graphics plane are combined on the interactive graphics plane, an area corresponding to the display position of the reduced video data on the video plane is designated as a transparent area. Video data such as GUI parts and so forth are placed on the interactive graphics plane in a predetermined manner. In addition, a wallpaper picture is displayed in other than the transparent area and the part video data area. As a result, the wallpaper picture is displayed in the background of the GUI part video data and the reduced moving picture data without need to add a new plane to the plane structure of the BD-ROM HD movie mode.

DESCRIPTION OF REFERENCE NUMERALS

10 VIDEO PLANE
11 PRESENTATION GRAPHICS PLANE
12 INTERACTIVE GRAPHICS PLANE
21, 23, 25, 28 MULTIPLICATION DEVICE
24, 29 ADDITION DEVICE
50 SECOND VIDEO PLANE
51 SWITCH
100 PLAYER-DECODER
106 MULTIMEDIA ENGINE
116 GRAPHICS DECODER
117 GRAPHICS DECODER
120 MPEG VIDEO DECODER
132 GRAPHICS PLANE A
133 GRAPHICS PLANE B
134 VIDEO PLANE
160 SECOND VIDEO PLANE
200 WALLPAPER PICTURE
201 MOVING PICTURE
202A, 202B PART
210 WALLPAPER PICTURE
211A, 211B, 211C, 211D PART
220 VIDEO OUTPUT SECTION
221A, 221B FRAME BUFFER
222A, 222B DOWN CONVERTER
223 SWITCH
230 SUB SCREEN
301 CPU
302 DRAM
303 GRAPHICS SECTION
304 VRAM

The invention claimed is:

1. A reproduction apparatus for reproducing content data comprising:
a reproducing unit configured to reproduce the content data from a recording medium;
a determining unit configured to determine whether the content data being currently reproduced from the recording medium includes one of a first moving picture, a second moving picture, presentation graphics data, and interactive graphics data, and provides the content data being currently reproduced to one of a first plane memory, a second plane memory, a third plane memory, and a fourth plane memory based on the determination;
the first plane memory configured to store the first moving picture data reproduced from the recording medium;
the second plane memory configured to store the second moving picture data reproduced from the recording medium;
a selection means for selecting at least one of an output of the first plane memory and the second plane memory on a pixel-by-pixel basis;
a first scaling unit configured to change a size of the first moving picture output from the first plane memory;
a second scaling unit configured to change a size of the second moving picture output from the second plane memory;
the third plane memory configured to store the presentation graphics data reproduced from the recording medium;
the fourth plane memory configured to store the interactive graphics data reproduced from the recording medium;
a first blending unit configured to modify an opacity of an output from the selection means based on a first predetermined opacity value;
a second blending unit configured to modify an opacity of the presentation graphics data stored in the third plane memory based on the first predetermined opacity value;
a first combining means for adding an output from the first blending unit and the second blending unit;
a third blending unit configured to modify an opacity of an output from the first combining means based on a second predetermined opacity value;
a fourth blending unit configured to modify an opacity of the interactive graphics data stored in the fourth plane memory based on the second predetermined opacity value; and
a second combining means for adding an output from the third blending unit and the fourth blending unit,
wherein the selection means selects corresponding to an intended display position of a reduced size moving picture, and a display signal is generated based on the output of the selection means, and wherein the first plane memory is a bottommost plane arranged before the second plane memory, the second plane memory is arranged between the first plane memory and the third plane memory, the third plane memory is arranged between the second plane memory and the fourth plane memory, and the fourth plane memory is a topmost plane.

2. The reproduction apparatus as set forth in claim 1, wherein one of the first plane memory and the second plane memory stores reduced moving picture data of which the moving picture data have been reduced corresponding to a display position thereof, and the selection means selects at least one of an output of the first plane memory and the second plane memory which stores the reduced moving picture data.

3. The reproduction apparatus as set forth in claim 2, wherein one of the first plane memory and the second plane memory stores wallpaper picture data instead of the moving picture data and the selection means is configured to select the plane memory storing the wallpaper picture data.

4. The reproduction apparatus as set forth in claim 1, wherein the presentation graphics data is subtitle data.

5. The reproduction apparatus as set forth in claim 1, wherein a combination ratio of the first combining means is controlled based on the presentation graphics data.

6. The reproduction apparatus as set forth in claim 1, wherein a combination ratio of the second combining means is controlled based on video data.

7. The reproduction apparatus as set forth in claim 1, wherein an output of the selection means is supplied to a plane memory.

8. The reproduction apparatus as set forth in claim 1, wherein a transparent area in which the output of the third blending unit is displayed with video data that are added with the output of the third blending unit by the second combining means is placed corresponding to the display position of the reduced moving picture data.

9. The reproduction apparatus as set forth in claim 8, wherein a wallpaper picture is displayed in the other than the transparent area of the video data.

10. The reproduction apparatus as set forth in claim 9, wherein a picture of a part is also displayed with the output of the second combining means, and
wherein the wallpaper picture is displayed in other than the transparent area and the display area of the picture of the part.

11. A reproduction method, implemented on a reproduction apparatus, for reproducing content data, the method comprising:
reproducing the content data from a recording medium;
determining whether the content data being currently reproduced from the recording medium includes one of a first moving picture, a second moving picture, presentation graphics data, and interactive graphics data, and providing the content data being currently reproduced to one of a first plane memory, a second plane memory, a third plane memory, and a fourth plane memory based on the determination;
storing the first moving picture data reproduced from the recording medium to the first plane memory;
storing the second moving picture data reproduced from the recording medium to the second plane memory; and
selecting, at a selection unit, one of outputs of the first plane memory and the second plane memory on a pixel-by-pixel basis,
changing, at a first scaling unit, a size of the first moving picture output from the first plane memory or changing, at a second scaling unit, a size of the second moving picture output from the second plane memory;
storing the presentation graphics data reproduced from the recording medium to the third plane memory;
storing the interactive graphics data reproduced from the recording medium to the fourth plane memory;
modifying, at a first blending unit, an opacity of an output from the selection unit based on a first predetermined opacity value;
modifying, at a second blending unit, an opacity of the presentation graphics data stored in the third plane memory based on the first predetermined opacity value;
adding, at a first combining means, an output from the first blending unit and the second blending unit;
modifying, at a third blending unit, an opacity of an output from the first combining means based on a second predetermined opacity value;
modifying, at a fourth blending unit, an opacity of the interactive graphics data stored in the fourth plane memory based on the second predetermined opacity value; and
adding, at a second combining means, an output from the third blending unit and the fourth blending unit,
wherein the selection means selects corresponding to an intended display position of a reduced size moving picture,
wherein a display signal is generated based on an output of the selection step, and
wherein the first plane memory is a bottommost plane arranged before the second plane memory, the second plane memory is arranged between the first plane memory and the third plane memory, the third plane memory is arranged between the second plane memory and the fourth plane memory, and the fourth plane memory is a topmost plane.

12. A non-transitory computer readable recording medium on which a reproduction program has been recorded, the reproduction program includes instructions which when executed by a computer causes the computer to execute a reproduction method, the method comprising:
reproducing content data from a recording medium;
determining whether the content data being currently reproduced from the recording medium includes one of a first moving picture, a second moving picture, presentation graphics data, and interactive graphics data, and providing the content data being currently reproduced to one of a first plane memory, a second plane memory, a third plane memory, and a fourth plane memory based on the determination;
storing the first moving picture data reproduced from the recording medium to the first plane memory;
storing the second moving picture data reproduced from the recording medium to the second plane memory; and
selecting, at a selection means, one of outputs of the first plane memory and the second plane memory on a pixel-by-pixel basis,
changing, at a first scaling unit, a size of the first moving picture output from the first plane memory or changing, at a second scaling unit, a size of the second moving picture output from the second plane memory;
storing the presentation graphics data reproduced from the recording medium to the third plane memory;
storing the interactive graphics data reproduced from the recording medium to the fourth plane memory;
modifying, at a first blending unit, an opacity of an output from the selection means based on a first predetermined opacity value;

modifying, at a second blending unit, an opacity of the presentation graphics data stored in the third plane memory based on the first predetermined opacity value;

adding, at a first combining means, an output from the first blending unit and the second blending unit;

modifying, at a third blending unit, an opacity of an output from the first combining means based on a second predetermined opacity value;

modifying, at a fourth blending unit, an opacity of the interactive graphics data stored in the fourth plane memory based on the second predetermined opacity value; and adding, at a second combining means, an output from the third blending unit and the fourth blending unit, wherein the selection means selects corresponding to an intended display position of a reduced size moving picture, and a display signal is generated based on an output of the selection step, and wherein the first plane memory is a bottommost plane arranged before the second plane memory, the second plane memory is arranged between the first plane memory and the third plane memory, the third plane memory is arranged between the second plane memory and the fourth plane memory, and the fourth plane memory is a topmost plane.

* * * * *